US007314417B2

United States Patent
Babej et al.

(10) Patent No.: US 7,314,417 B2
(45) Date of Patent: Jan. 1, 2008

(54) METHOD FOR THE MANUFACTURE OF HOLLOW BODY ELEMENTS, HOLLOW BODY ELEMENT AND ALSO PROGRESSIVE TOOL FOR CARRYING OUT THE METHOD

(75) Inventors: Jiri Babej, Lich (DE); Richard Humpert, Roshback v.d.H. (DE); Michael Vieth, Vilbel (DE)

(73) Assignee: Profil Verbindungstechnik GmbH & Co. KG (DE)

( * ) Notice: Subject to any disclaimer, the term of this patent is extended or adjusted under 35 U.S.C. 154(b) by 101 days.

(21) Appl. No.: 11/048,219

(22) Filed: Jan. 31, 2005

(65) Prior Publication Data

US 2005/0166381 A1 Aug. 4, 2005

Related U.S. Application Data

(63) Continuation-in-part of application No. 10/240,070, filed as application No. PCT/EP01/03614 on Mar. 29, 2001, now Pat. No. 7,090,451.

(30) Foreign Application Priority Data

| Mar. 31, 2000 | (DE) | ............................... 100 16 227 |
| Jan. 29, 2004 | (DE) | ..................... 10 2004 004 589 |
| Sep. 17, 2004 | (DE) | ..................... 10 2004 045 159 |

(51) Int. Cl.
*B21D 53/24* (2006.01)

(52) U.S. Cl. ........................... 470/25; 470/21; 470/91; 470/109; 470/167; 72/405.06

(58) Field of Classification Search ................ 470/18, 470/20, 21, 25, 26, 91, 109, 167; 72/405.06, 72/336, 337, 338, 405.01
See application file for complete search history.

(56) References Cited

U.S. PATENT DOCUMENTS 2,096,623 A 10/1937 Almdale (Continued)

FOREIGN PATENT DOCUMENTS

DE 15 52 003 A1 1/1970

(Continued)

OTHER PUBLICATIONS

European Partial Search report dated Jul. 6, 2005.

(Continued)

*Primary Examiner*—Ed Tolan
(74) *Attorney, Agent, or Firm*—Hunton & Williams LLP; Eugene C. Rzucidlo

(57) ABSTRACT

A method of manufacturing hollow body elements such as nut elements for the attachment to components consisting normally of sheet metal, in particular to the manufacture of hollow body elements with an at least substantially square or rectangular outer periphery by cutting individual elements by length from a section present in the form of a bar section or a coil after prior punching of apertures in the section, optionally with subsequent formation of a thread cylinder, utilizing a progressive tool having a plurality of working stations in which respective processes are carried out is characterized in that in each working station two respective operations are carried out for the section, or for each of a plurality of sections arranged alongside one another, for each stroke of the progressive tool at the same time. A hollow body element and also a progressive tool are also claimed.

32 Claims, 30 Drawing Sheets

U.S. PATENT DOCUMENTS 3,711,931 A * 1/1973 Ladouceur et al. ........... 29/412
3,775,791 A    12/1973 Grube
3,793,658 A * 2/1974 Ladouceur ................... 470/21
4,306,654 A * 12/1981 Grube ........................ 206/343
4,733,552 A * 3/1988 Lefils ...................... 72/405.06
5,016,461 A * 5/1991 Walker et al. ................ 72/336

FOREIGN PATENT DOCUMENTS

DE      101 15 420 A1    4/2001
WO      WO 01/72449 A2   10/2001

OTHER PUBLICATIONS

English Translation of European Partial Search Report dated Jul. 6, 2005.

German Search Report dated May 24, 2004 for DE 10 2004 004 589.5 with English language translation of search report.

* cited by examiner

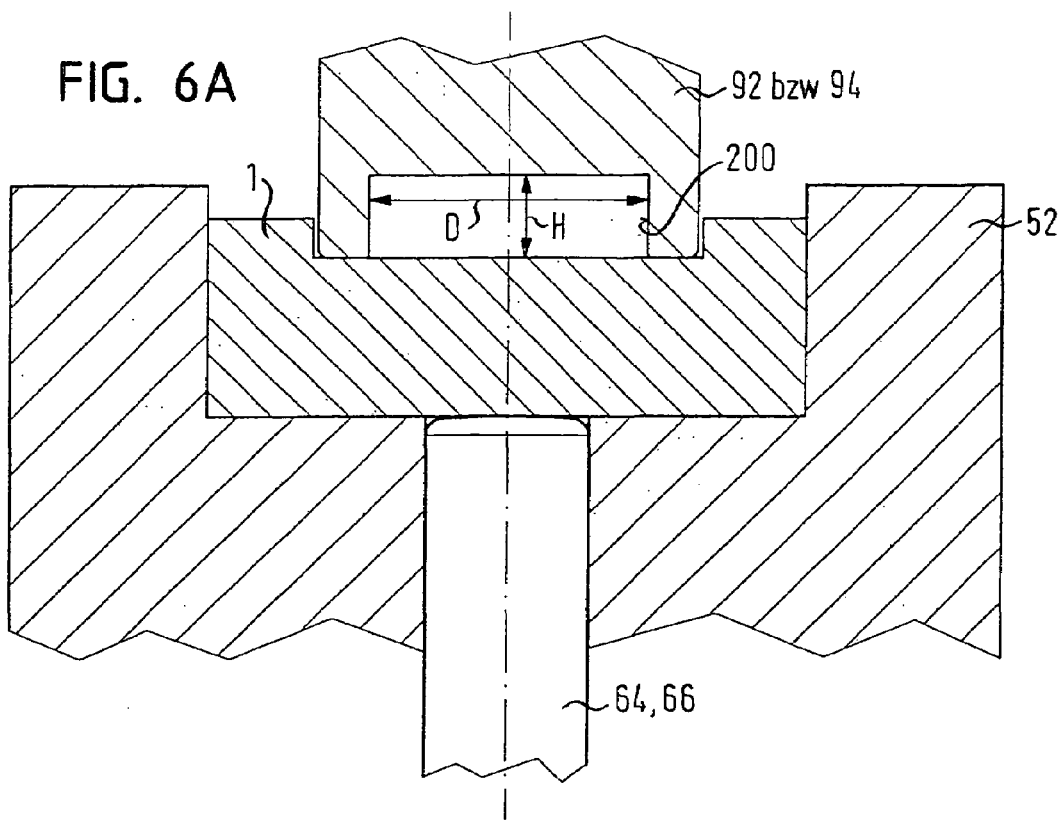
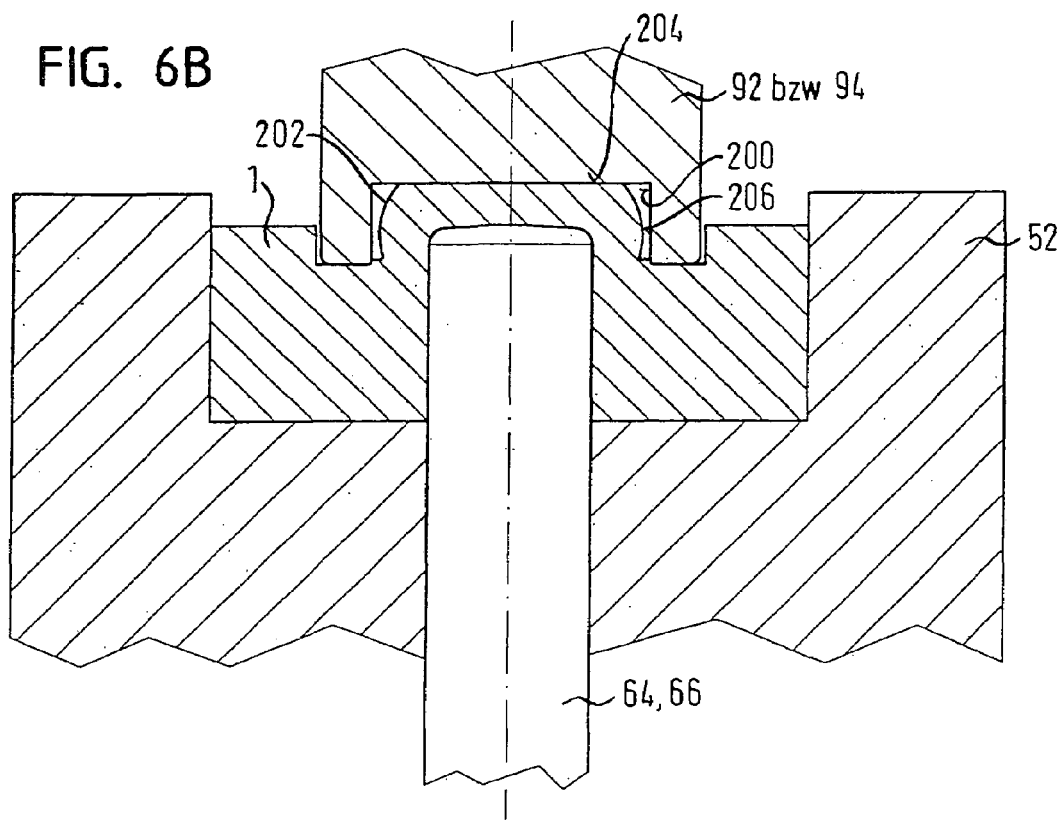

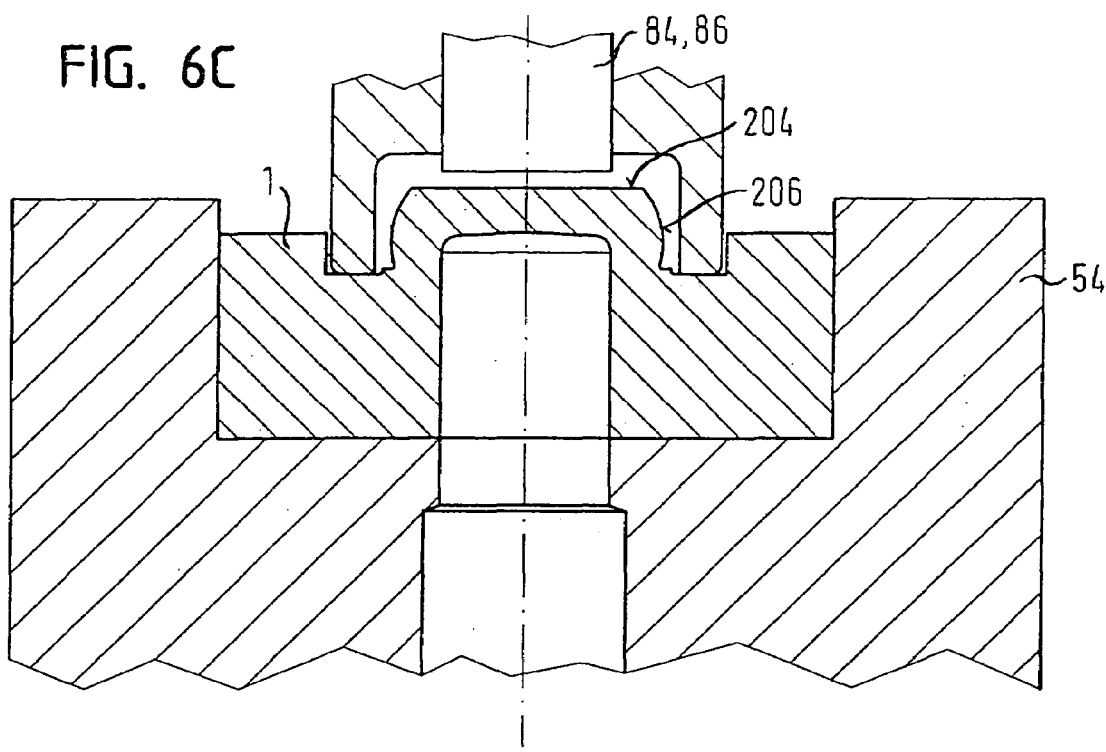
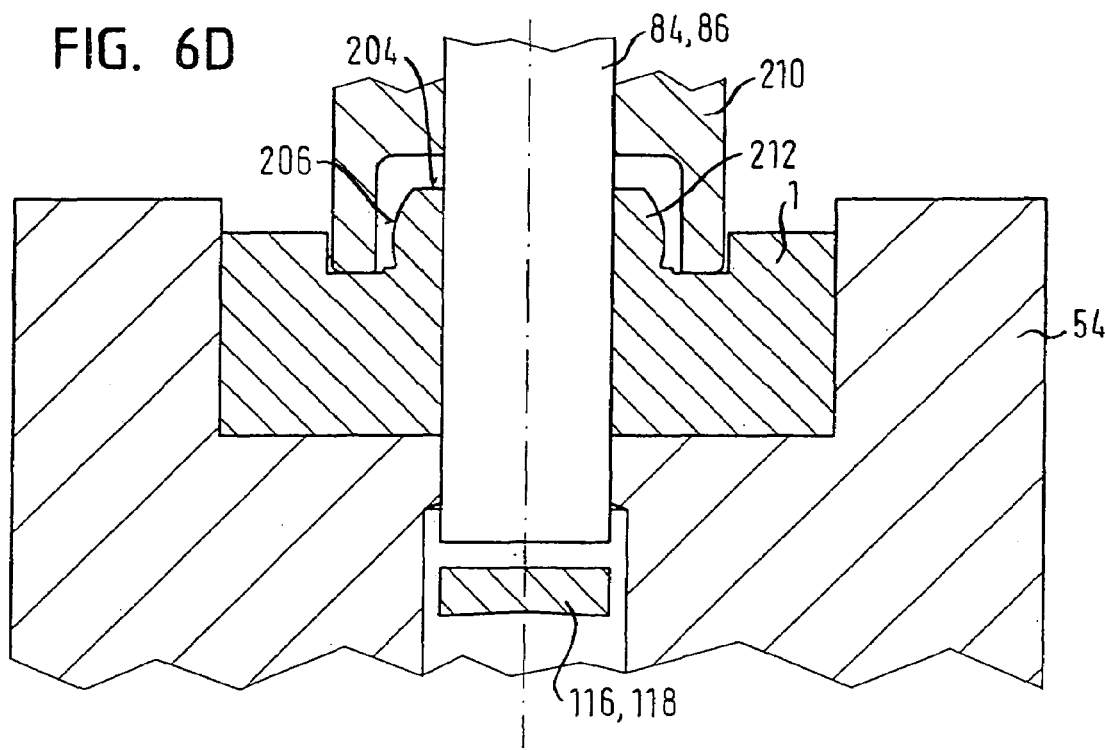

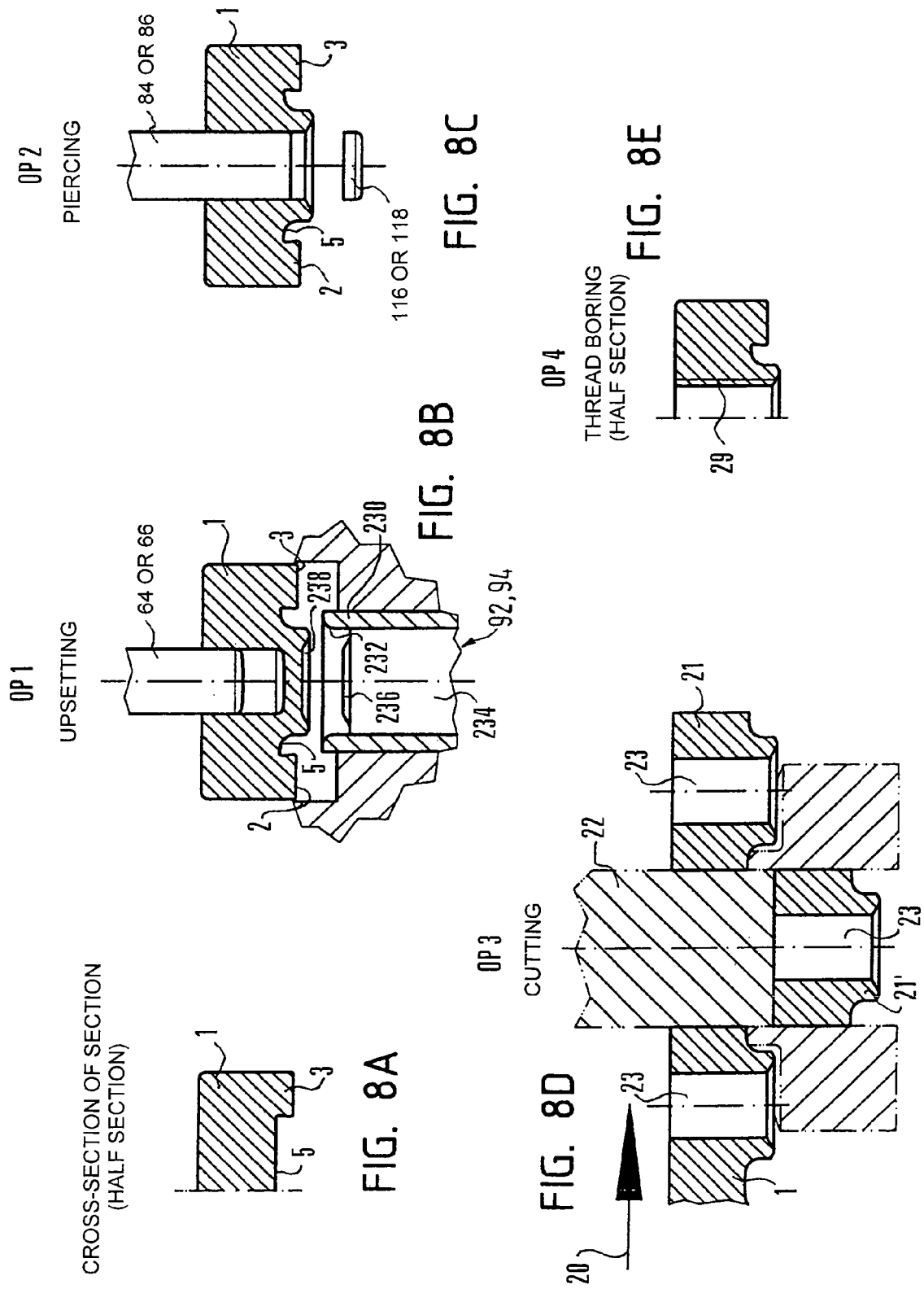

CROSS-SECTION OF SECTION (HALF SECTION)

OP 1
UPSETTING

OP 2
PIERCING

THREAD BORING (HALF SECTION)

OP 1
UPSETTING AND CHAMFERING (INDENTATION)

OP 2
PIERCING

CROSS-SECTION OF SECTION (HALF SECTION)

OP 3
CUTTING

OP 4
THREAD BORING (HALF SECTION)

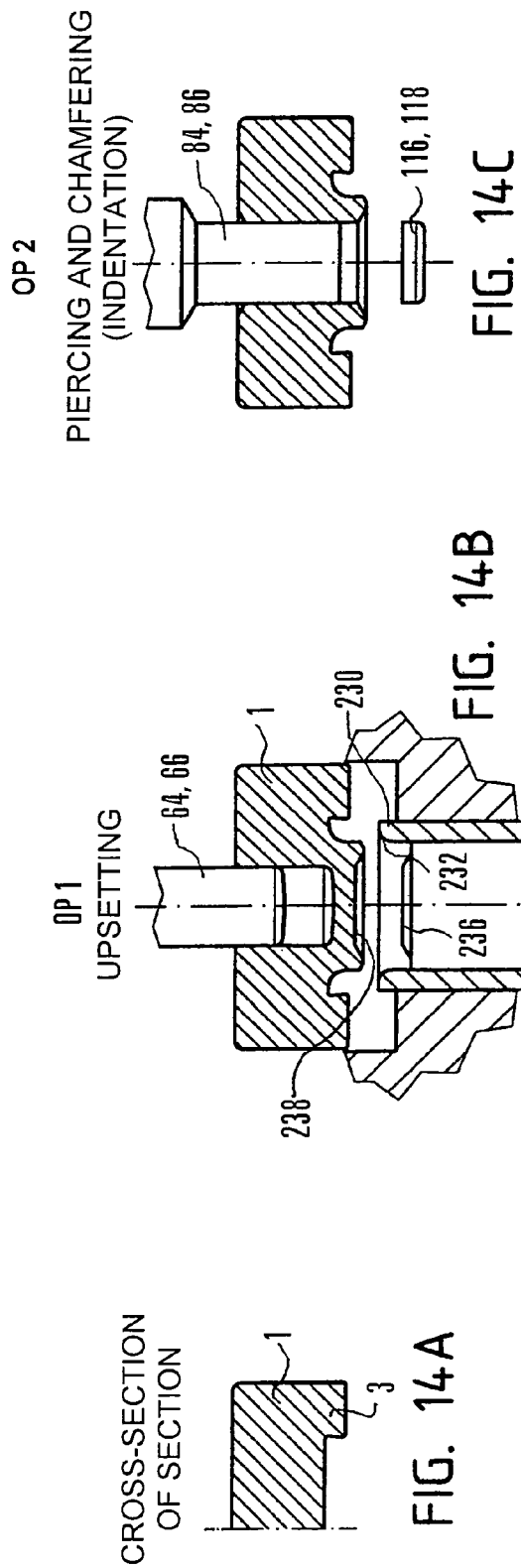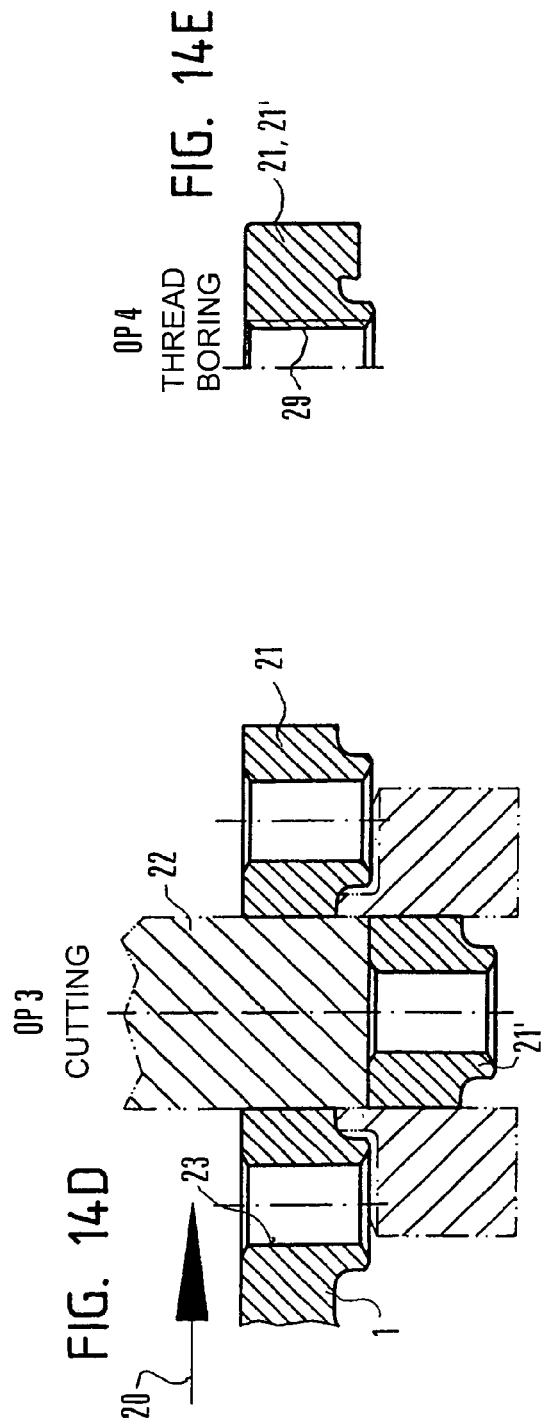

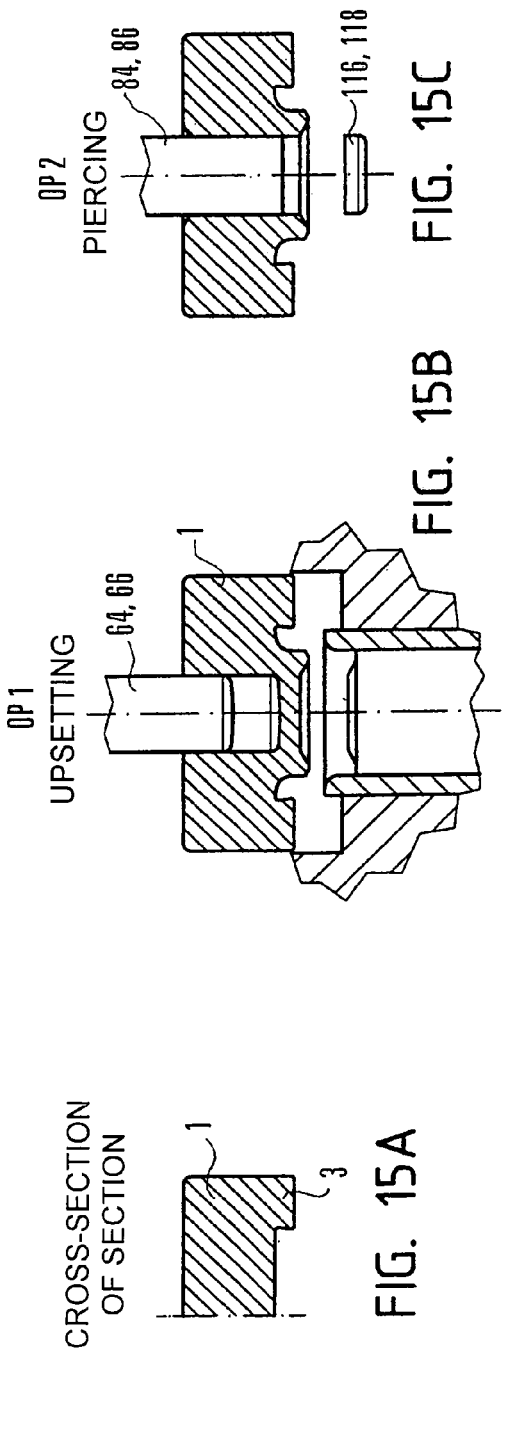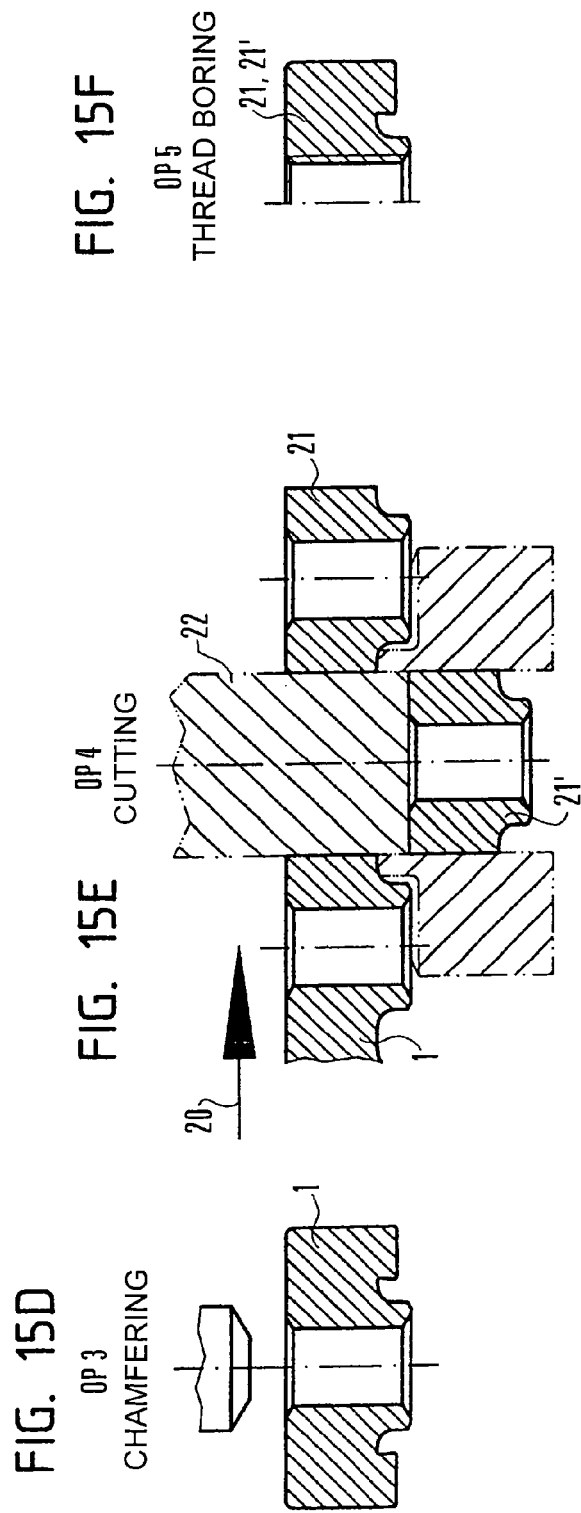

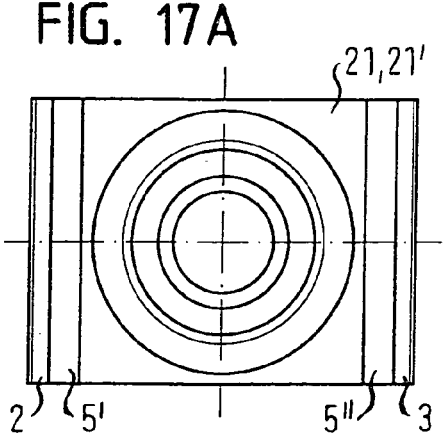
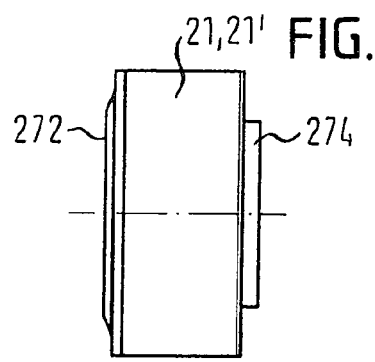
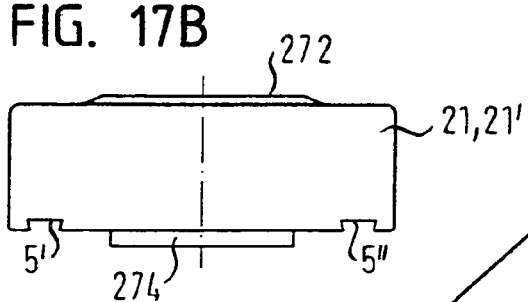
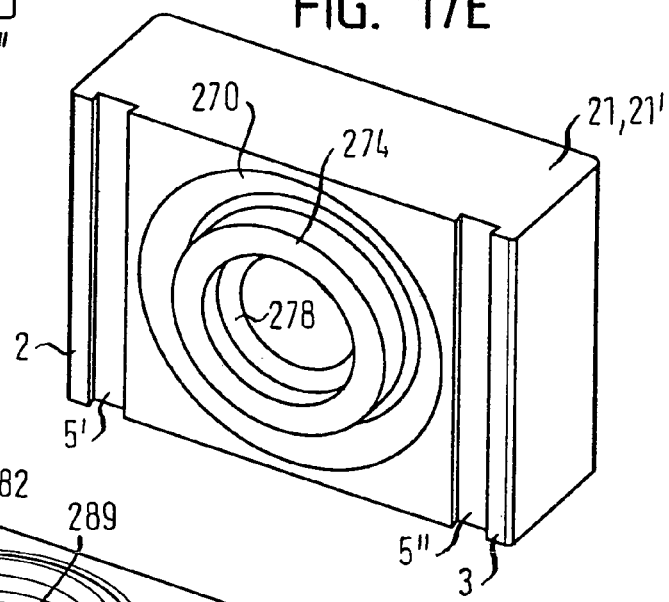
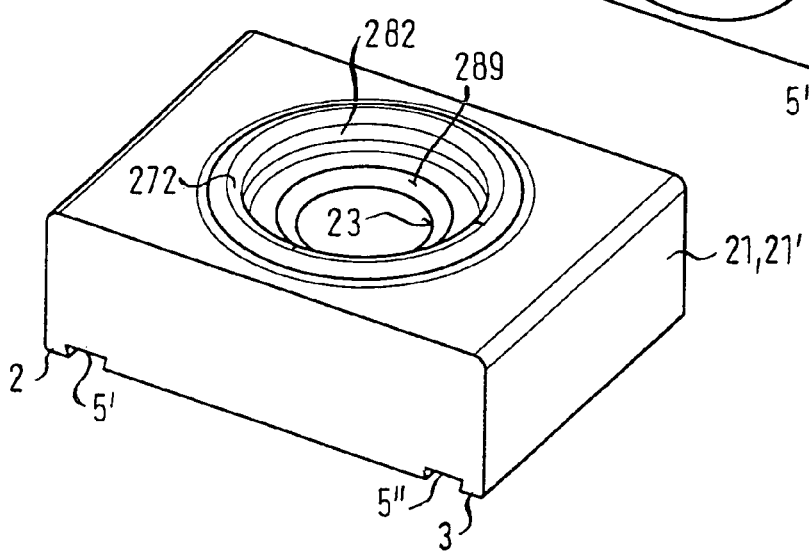

CROSS-SECTION OF
SECTION (HALF SECTION)

OP 2
(PIERCING)

OP 1
(UPSETTING)

THREAD BORING

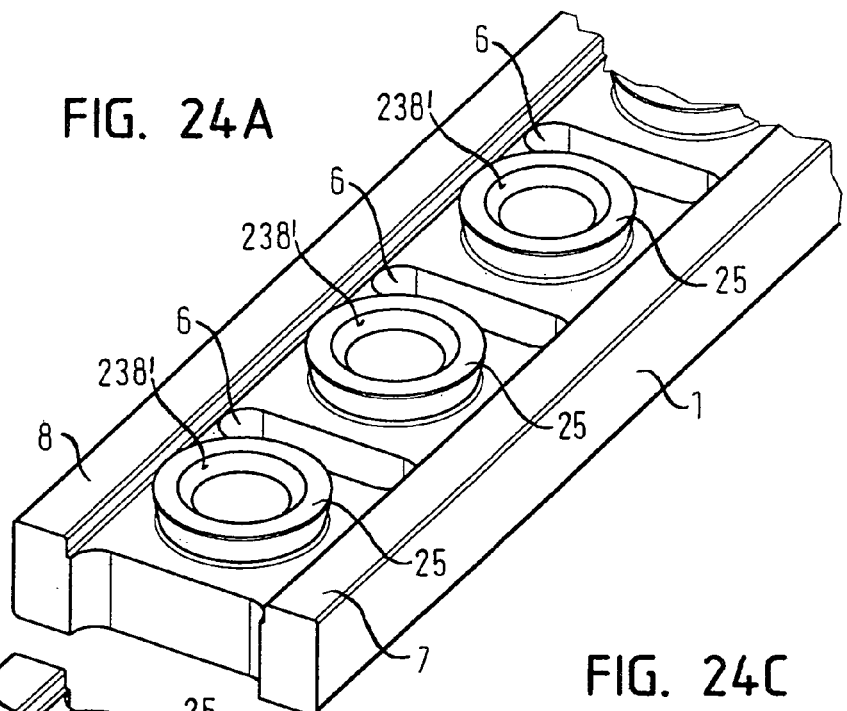
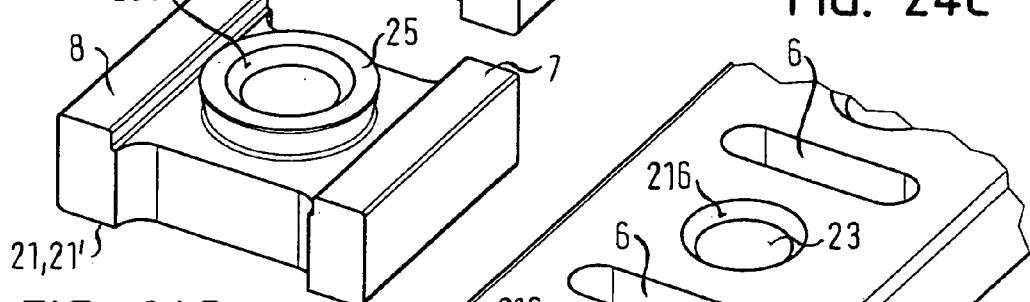
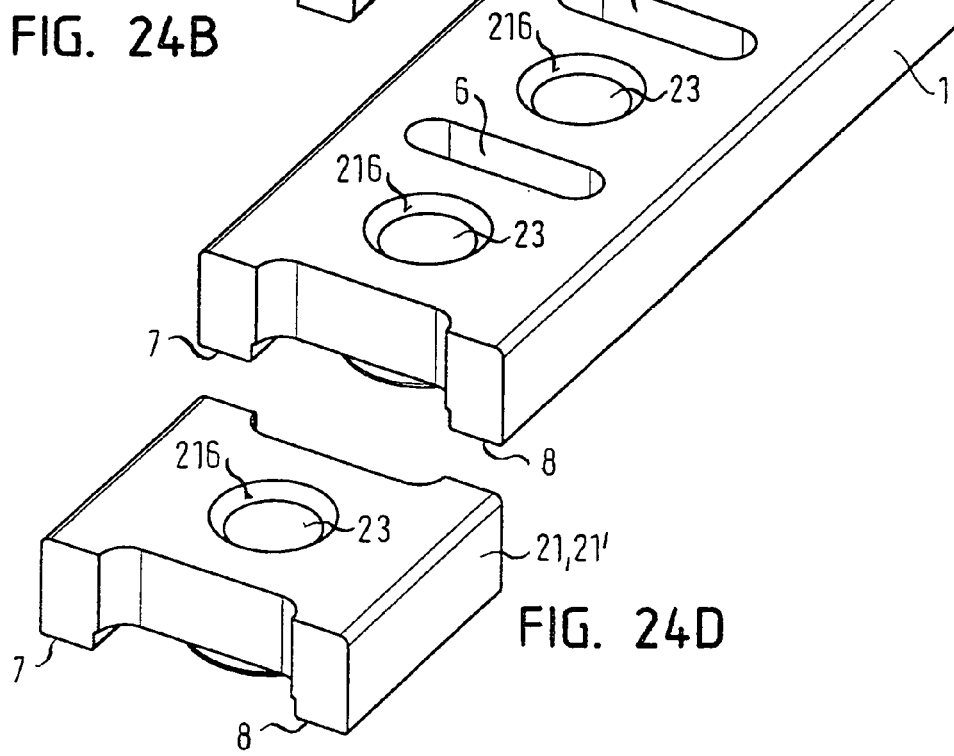

METHOD FOR THE MANUFACTURE OF HOLLOW BODY ELEMENTS, HOLLOW BODY ELEMENT AND ALSO PROGRESSIVE TOOL FOR CARRYING OUT THE METHOD

CROSS REFERENCE TO RELATED APPLICATIONS

This application is a continuation-in-part of and takes priority from U.S. Ser. No. 10/240,070 now U.S. Pat. No. 7,090,451, such application claiming priority to the International Patent Application PCT/EP01/03614 filed 29 Mar. 2001 and to German application, Serial Number 100 16 227.4 filed 31 Mar. 2000, each of the aforesaid applications being incorporated herein by reference in their entirety.

FIELD OF THE INVENTION

The present invention relates to a method for the manufacture of hollow body elements such as nut elements for attachment to components normally consisting of sheet metal, in particular for the manufacture of hollow body elements having an at least substantially square or rectangular outer periphery, by cutting individual elements by length from a section present in the form of a bar section or of a coil after the previous punching of apertures in the section, optionally with subsequent formation of a thread cylinder, utilizing a progressive tool having a plurality of working stations in which respective operations are carried out. Furthermore, the present invention relates to a section for using such a method, to the hollow body elements which are manufactured in accordance with the method and also to a progressive tool for carrying out the methods.

A method of the initially named kind and also corresponding hollow body elements are for example known from WO 01/72449 A2. A similar method is also known from U.S. Pat. No. 4,971,499. Rectangular hollow body elements are also sold in Germany by the company Profil Verbindungstechnik GmbH & Co. KG under the designation HI rectangular nut.

BRIEF SUMMARY OF THE INVENTION

The object of the present invention is to further develop the method of the initially named kind so that hollow body elements, in particular rectangular nut elements, can be manufactured at a favorable price. Furthermore, the hollow body elements should have mechanical characteristics which are at least equivalent to those of the hollow body elements which are manufactured in accordance with WO 01/72449 A2 or in accordance with the German Utility Model 202 05 192.7, which for example have a high pull-out resistance, an excellent security against rotation and beyond this a reduced notch action, so that the fatigue characteristics of components assemblies consisting of a component which normally consists of sheet metal and hollow body elements attached to the latter are improved, even with dynamic loads.

In order to satisfy this object one proceeds method-wise in such a way that two operations are carried out in each working station at the same time for each section for each stroke of the progressive tool.

In this process the section that is used can for example have a shape which is already known from WO 01/72449 or from DE Gbm 202 05 1972.7, for example a section which is at least substantially rectangular in cross-section and which has, at the side which later confronts the component, two bars which have a spacing from one another, which extend parallel to the longitudinal sides of the section and which are likewise at least substantially rectangular in cross-section, the bars being separated or formed by a groove of rectangular cross-section which is broader in comparison to the bars and which has a depth which corresponds to the height of the respective bars, at least substantially. The inner side surfaces of the bars of the section can stand perpendicular to the under-side of the section, or the bars can each have an inclined flank at the inner side which forms an undercut. Furthermore, a section could be selected in which the two bars are bounded or formed by respective grooves which likewise extend parallel to the longitudinal sides of the section, which have an at least substantially rectangular cross-section and also a depth which corresponds to the height of the respective bars, with the one side of the groove which forms an inner flank of the respective bar and also the second side of each groove being inclined so that a dovetail-like groove cross-section is present. Designs can also be considered in which the side surfaces of the grooves stand perpendicular to the lower side of the section, i.e. do not form any undercuts.

Irrespective of which specific shape is selected for the section the manufacture in working steps, in which two operations are always carried out for each section in each station, leads to a situation in which the productivity of the manufacturing plant is doubled without the cost and complexity for the manufacture of the progressive tooling increasing to a degree which could no longer be considered reasonable. Admittedly a certain amount of extra cost and complexity is necessary through the doubling of the working elements, this can however be straightforwardly amortized relatively early by corresponding production quantities of the hollow body elements.

It is admittedly possible to process several sections in parallel in one progressive tool, this is however not necessarily to be preferred because when problems arise with one section, i.e. with the processing of one section, the entire progressive tool must be stopped until the breakdown is overcome, whereby considerable production losses could arise. Nevertheless, the present invention can also be extended to a progressive tool which simultaneously processes a plurality of sections.

Particularly preferred embodiments of the method of the invention, of the hollow body elements in accordance to the invention and also of the progressive tool of the invention can be found from the further patent claims.

It is particularly favorable in a method of the invention or with the design of the progressive tool of the invention that the number of working station in which an increase of the length of the section is to be feared through the processing which takes place can be restricted to two or three at a maximum, namely the steps of upsetting, of hole piercing and of the optionally separately carried out indentation operation, with it being possible to combine the indentation operation with the upsetting operation and/or with the piercing operation. Since a pronounced elongation of the section during processing is no longer to be feared this leads to an improvement of the reliability of the progressive tool and also to a simplification of it. Furthermore, the progressive tool can be designed in accordance with the invention so that the section has certain expansion possibilities in the vertical direction and also in the width direction, which further reduce the problem of elongation, which further simplify the design of the progressive tool and which ultimately also do not involve any disadvantages for the finish manufactured hollow body elements. Further advantages of the method of the invention, of the hollow body elements of the invention and also of the progressive tool used in accordance with the invention can be found in the Figures and in the subsequent description of the Figures.

DETAILED DESCRIPTION OF THE PREFERRED EMBODIMENTS

Figure 1:
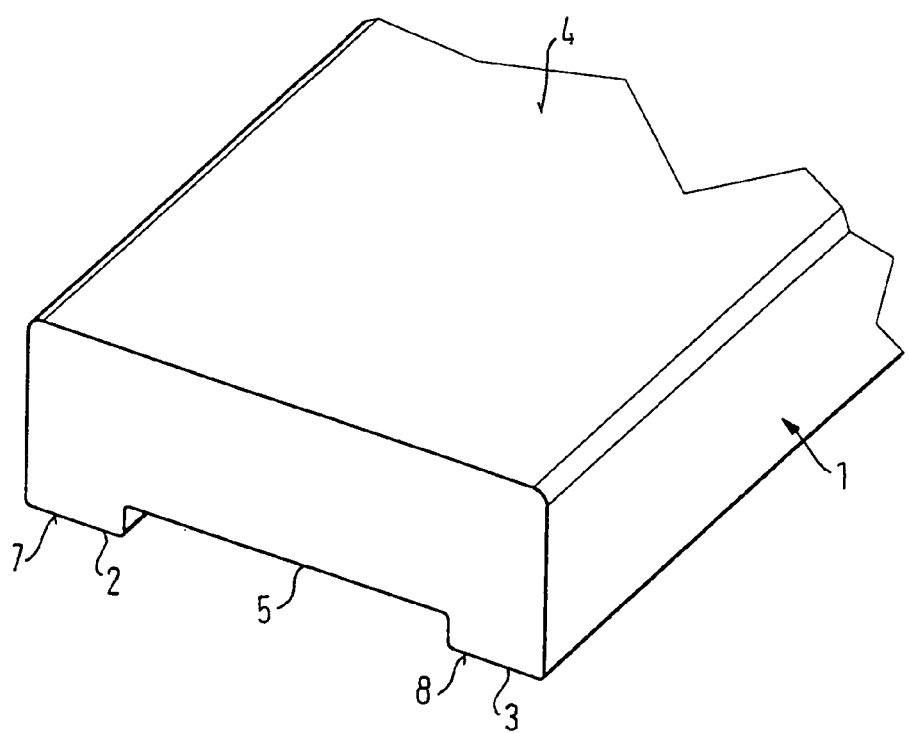
FIG. 1 a first embodiment of a section which is known per se from WO 01/72449 but which is however processed in accordance with FIG. 2 in a progressive tool for the purpose of the present invention, with FIG. 2 reproducing a representation of a progressive tool sectioned in the direction of movement of the section, FIG. 3 an enlarged representation of the progressive tool of FIG. 2 in the region of the working stations, FIG. 4 a representation similar to FIG. 2 but of an alternative progressive tool, FIG. 5 an enlarged representation of the working stations of the progressive tool of FIG. 4, FIGS. 6A-F various stages of manufacture of a hollow body element from the section of FIG. 1 in a progressive tool in accordance with the invention, with only the important parts of the individual working stations being shown, FIG. 7A an alternative section which is known per se from DE Gbm 20205192.7, FIGS. 7B-7D representations of a functional element of the invention which is manufactured in accordance with the invention from the section of FIG. 7A, FIGS. 8A-E the individual manufacturing steps for the functional element of the FIGS. 7B-7D, FIG. 9 a representation of the working stations of a progressive tool which is used to carry out the method of FIGS. 8A-8D, FIGS. 10A-C a die button which can be used for the attachment of the functional element of FIGS. 7B-7D, with the die being very similar to the die of FIG. 6 of the German Utility Model 20205192.7, FIGS. 11A-C a further representation of the elements in accordance with the invention which is manufactured using the section of FIG. 1, FIGS. 12A-D the individual manufacturing steps for the manufacture of the functional element in accordance with FIGS. 11A-C, FIGS. 13A-E a variant for the manufacture of the functional element of FIGS. 11A-C, FIGS. 14A-E a further alternative method for the manufacture of the functional elements in accordance with FIGS. 11A-C, FIG. 15 likewise a further alternative process for the manufacture of a functional element in accordance with FIGS. 11A-C, FIG. 16 a further section in accordance with the invention, FIGS. 17A-E a functional element in accordance with the invention manufactured from the section of FIG. 16, FIGS. 18A-D the individual steps in the manufacture of the functional element of FIGS. 17A-C, FIGS. 19A-E a die button for the attachment of the functional element in accordance with FIGS. 17A-C to a sheet metal component and corresponding essentially to the die of FIGS. 12A and 12B of the German Utility Model 20205192.7, FIGS. 20A-E a further functional element which can be manufactured in accordance with the invention and which corresponds to the embodiment of FIGS. 9A-E of WO 01/72499, FIGS. 21A-B the functional element of FIGS. 20A-C secured to a sheet metal part, FIGS. 22A-D a sections directly prior to and after separation of the individual hollow body elements, with notches at the parting positions between the individual elements, FIGS. 23A-C the hollow body element which is manufactured using the strip in accordance with FIGS. 22A-D, FIGS. 24A-D a representation of a further section directly prior to and after separation of an individual hollow body element from the section, with elongate holes being provided at the separating points between neighboring hollow body elements and FIGS. 25A-C the hollow body element manufactured with the sections in accordance with FIGS. 24A-D, FIGS. 26A-E various representations of a further hollow body elements in accordance with the invention, with FIG. 26A showing a view from below in accordance with the arrow XXVIA of FIG. 26E, FIG. 26B showing a side view of the element in accordance with FIG. 26A in accordance with the plane of consideration XXVIB-XXVIB, FIG. 26C showing a sectional illustration corresponding to the sectional plane XXVIC-XXVIC of FIG. 26A and the FIGS. 26D and 26E showing two perspective representations coming obliquely from the top (FIG. 26D) and coming obliquely from below (FIG. 26E), FIGS. 27A-B two different partly sectioned representations of a component assembly consisting of a hollow body element in accordance with the FIGS. 26A-26E and a sheet metal part and indeed seen from above (FIG. 26A) and from below (FIG. 26B).

FIG. 1 shows a portion of an elongate section which is known per se from WO 01/72499 and which, can be processed, as can the other sections described in this application, and also further comparable sections, in a progressive tool 10 in order to manufacture hollow elements, for example nut elements having essentially rectangular or square shape. When the hollow elements are to be realized as nut elements a thread must be cut into or produced in the aperture of the hollow body element. This normally takes place outside of the progressive tool in a separate machine. Furthermore, the possibility exists of first manufacturing the thread after the attachment of hollow body element to a sheet metal part, for example by means of a thread forming or thread cutting bolt. In addition, it is not necessary to provide a thread in the hollow body element but rather the aperture of the hollow body element could serve as a smooth bore for the rotatable mounting of a shaft or as a socket for the reception of an inserted pin.

Figure 2:
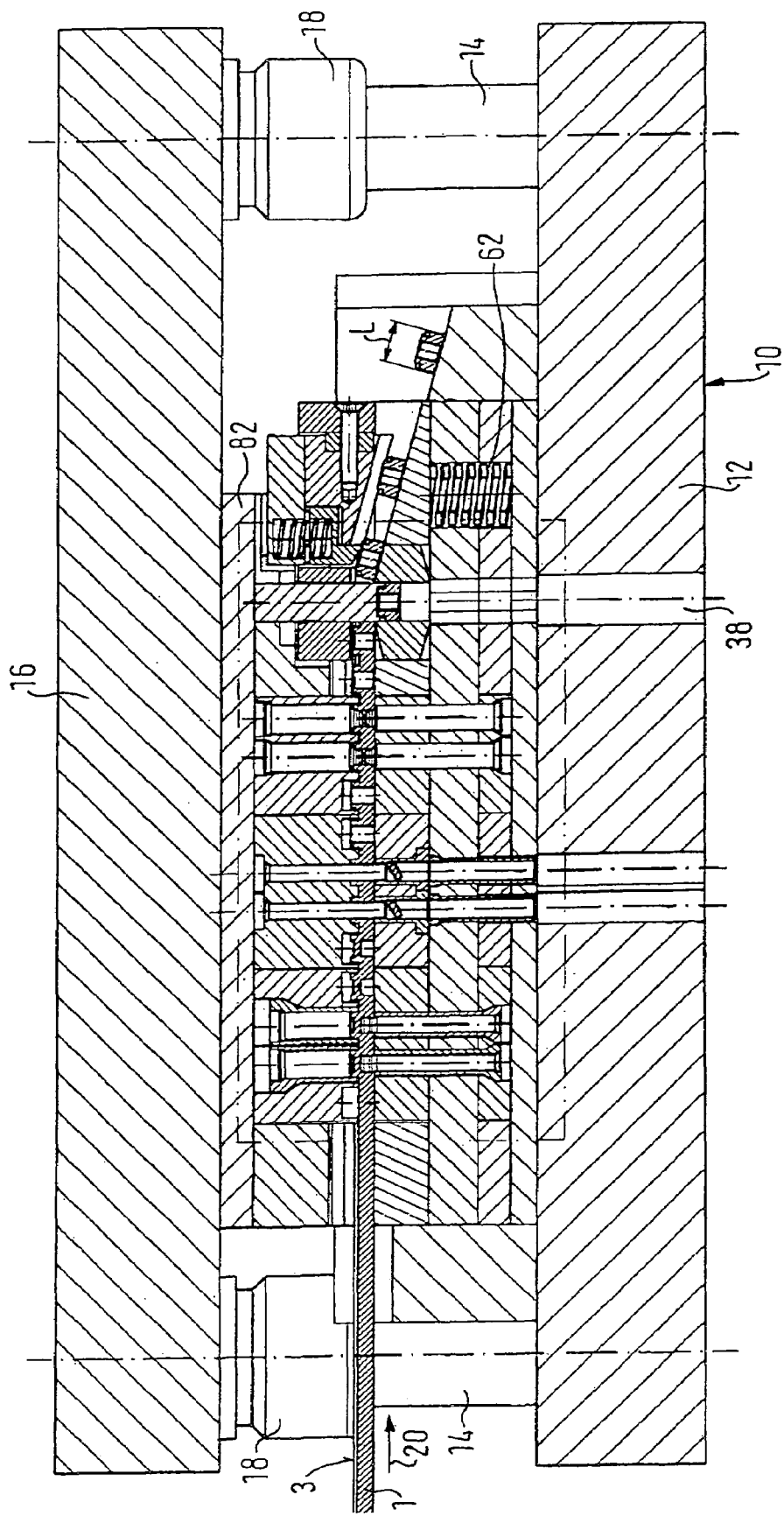

A first progressive tool, which serves on the manufacture of hollow body elements from the section of FIG. 1 or from a similar section, is shown in longitudinal section in FIG. 2, with the longitudinal section being taken through the centre of the section.

One can see from FIG. 2 a lower plate 12 which is normally secured to a press table either directly or indirectly via a non illustrated intermediate plate. The lower plate 12 carries a plurality of columns 14, four in this example, of which two can be seen, namely the two columns which lie behind the plane of the section. Above the columns there is a further plate 16 which is normally secured to the upper tool plate of the press or to an intermediate plate of the press. Guides 18 are screwed to the plate 16 (for example by means of screws which are not shown here) with the guides 18 being designed in order to slide up and down on the columns 14 in accordance with the stroke movement of the press. The section 1 is advanced in the direction of the arrow 20 for each stroke of the press and indeed by an amount which equals twice the longitudinal dimension L of the individual hollow body elements manufactured from the section. One notes that in the representation of FIGS. 2 and 3 the section 1 is guided through the progressive tool with the bars 2, 3 directly upwardly. In this example, as is evident from the enlarged representation of the central region of the progressive tool in FIG. 3, the progressive tool includes four working stations A, B, C, D in which each of which two processes are simultaneously carried out for each stroke of the press.

In the first station A a so-called upsetting operation is carried out.

In the second working station B a piercing operation is carried out and in the third working station C an indentation operation. Finally, in the fourth working station D a cut-off punch 22 is used in order to separate two hollow body elements from the section 1 for each stroke of the press. In this arrangement the right hand side of the punch cuts through the section at a parting position which is located behind the first hollow body element, i.e. the hollow body element 21 in FIG. 3, and also at a parting position behind the second hollow body element 21'. The progressive tool is shown in the closed position in FIGS. 2 and 3 in which the two hollow body elements 21 and 21' have just been separated from the section 1. Shortly before the cut-off operation the front side of the nut element 21 contacts the inclined surface 24 of the cam 27 which is pressed downwardly at right angles to the section by a compression coil spring 26. The advancing movement of the section thus presses the cam 27 via the inclined surface upwardly, whereby the spring 26 is compressed. After the cutting off of the first hollow body element 21 the cam 24 presses onto the right side of the nut element 21 and tilts this into the inclined position which can be seen at the right hand side of FIG. 3. The nut element 21 then drops onto a slide and out of the working region of the progressive tool and can for example be led sidewise out of the progressive tool in the position of FIG. 2, for example via a lateral slide under the action of gravity, or with a burst of compressed air.

The second hollow body element 21' falls through a hole 28 in the cut-off die 30 and subsequently through corresponding bores 32, 34, 36 and 38 which are formed in the plates 40, 42, 44 and 12.

The bores or the hole 38 in the plate 12, together with a further bore (not shown) in the press table or in a intermediate plate provided between the plate 12 and the press table enable(s) the nut elements such as 21' to be removed, for example under the action of gravity or via a lateral slide or under the application of a burst of compressed air.

Figure 3:
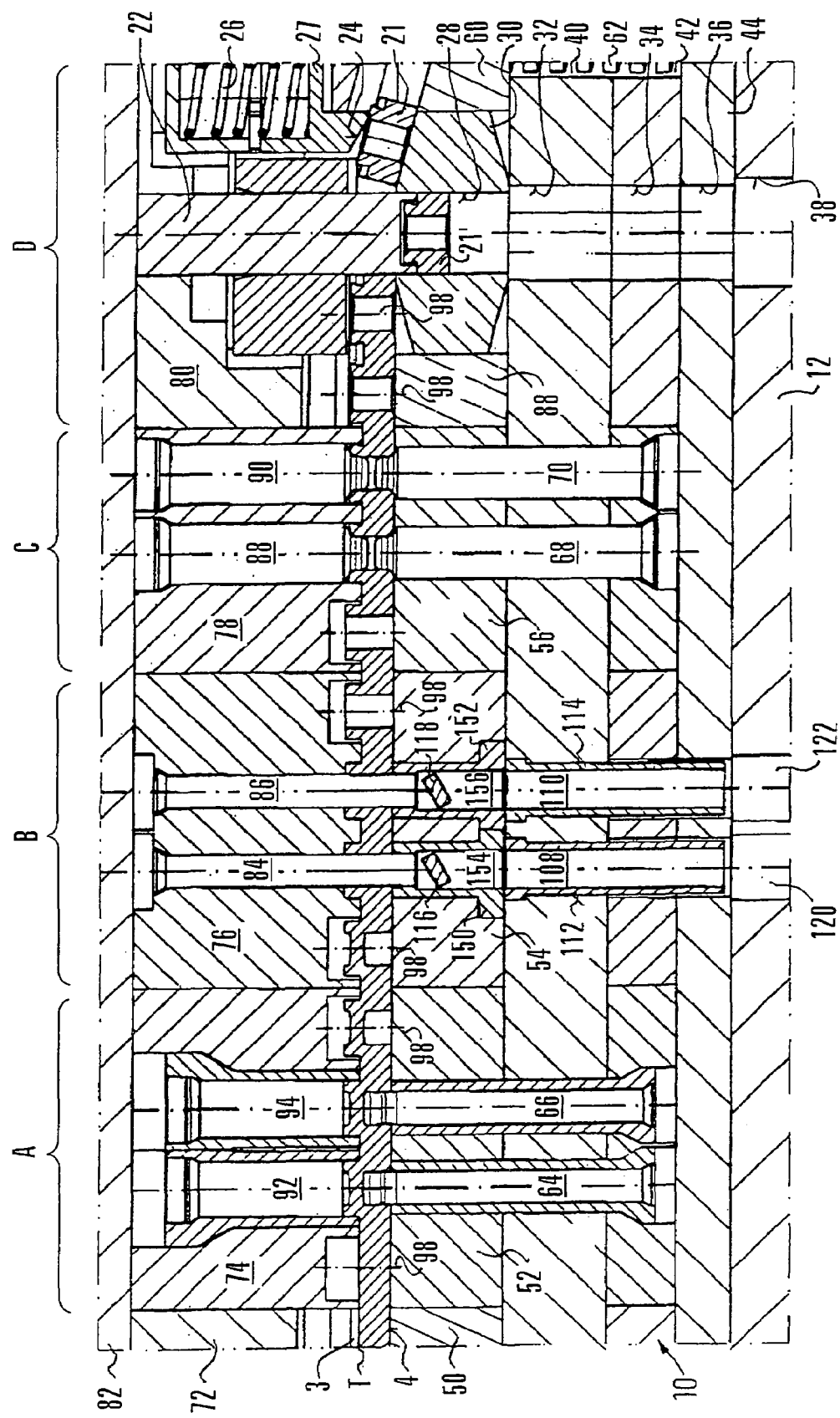

In the specific construction shown in FIG. 3 the plate 44 is screwed via non-illustrated bolts to the plate 12. The plate 42 consists of a plurality of plate sections which are associated with the respective working stations and which are screwed via non-illustrated screws (because they are arranged outside of the plane in the sectional representation) to the continuous plate 44. The continuous plate 40 is likewise screwed to the sections of the plate 42 and indeed also here by means of non-illustrated screws. Above the continuous plate 40 there are again plate sections 50, 52, 54, 56, 58 and 60 which are in turn screwed to the plate 40. The plate 50 is a support plate which forms a lower guide for the section 1, stated more precisely stated for the upper side of the section 1, which in this representation forms the lower side. The plate sections 52, 54 and 56 are associated with the working stations A, B and C, whereas the plate sections 58 and 60, which form a mount for the cut-off die 30, are associated with the working station D.

Powerful compression coil springs 62 are located at a plurality of positions between the continuous plate 44 and the plate sections 50, 52, 54, 56, 58 and 60 with only the one spring being visible in FIGS. 2 and 3 because the other springs are arranged outside the plane of the section. The springs, such as 62, have the function of lifting the plate sections 50 to 60 on opening of the press, whereby the sections 1 is also lifted and passes in this way out of the working region of the upsetting punch 64, 66 and out of the working region of the indentation punch 68 and 70 whereby the section can be further advanced by twice the amount of the length of the hollow body elements 21.

The partition plane of the progressive tool 10 is located above the section 1 and is indicated by T in FIG. 3.

Above the sections there are again plate sections 72, 74, 76, 78 and 80 which are screwed to a continuous plate 82—here also via non-illustrated screws. Furthermore, the plate 82 is screwed to the upper plate 16.

On opening of the press the plates 72, 74, 76, 78 and 80 are thus lifted with the plate 22 and the upper plate 16 and indeed to such an extent that the two hole punches 84, 86 and the two upper indentation punches 88 and 90, as well as the dies 92 and 94 which cooperate with the upsetting punches 64, 66 and also the cut-off punch 22, move out of engagement with the section 1. Through this movement, coupled with the lifting of the section by the spring 62, it is possible for the section 1 to be advanced further by twice the length dimension of the hollow body elements 21 in preparation for the next stroke of the press.

One notes that the working stations A and B have a longitudinal dimension, i.e. in the direction of movement 20 of the section 1 which corresponds to four times the length dimension of a hollow body element 21. The working station C has a length dimension which corresponds to three-times the length dimension of a hollow body element 21 whereas the working station D has a length dimension which corresponds to a multiple of the length dimension of the hollow body element 21 in this case to six times the length dimension. This signifies that so-called empty positions are present such as 98 at which no processing of the sections 1 takes place. These empty positions however provide space which is necessary in order to make the individual components of the tools that are used adequately stable and to support them.

Furthermore, one can see from FIG. 3 that the piercing dies 100, 102 which cooperate with the piercing punches 84, 86 have a central bore 104 and 106 respectively which are in line with further bores 108, 110 in insert sleeves 112, 114, which make it possible to remove the punched out slugs 116, 118. These namely fall through the bores 108, 114, which are larger in diameter than the bores 104, 106 and through the further bores 120, 122 in the plate 12 and can be removed or discharged via corresponding passages in the press table or in any intermediate plate that may be provided, in the same way and means as the nut elements 21'.

Although not shown here guide elements, which can for example be formed by cheeks of the plates 50, 52, 54, 56 and 58 are located to the left and right of the section 1, i.e. behind the plane of the drawing and in front of the plane of the drawing of FIG. 3, which ensure that the sections follows the desired path of movement through the progressive tool. A small lateral free space can be provided which is intended to permit any possible expansion of the section which may take place in the transverse direction.

The constructional details of the upsetting punches 64, 66, of the dies 92, 96 which cooperate with them, of the piercing punches 84, 86, of the dies 100, 102 which cooperate with them and of the indenting punches 88, 90 and 68, 70 can be seen from the drawings of FIGS. 2 and 3 and will be explained more precisely in other respects in the following drawings.

Figure 4:
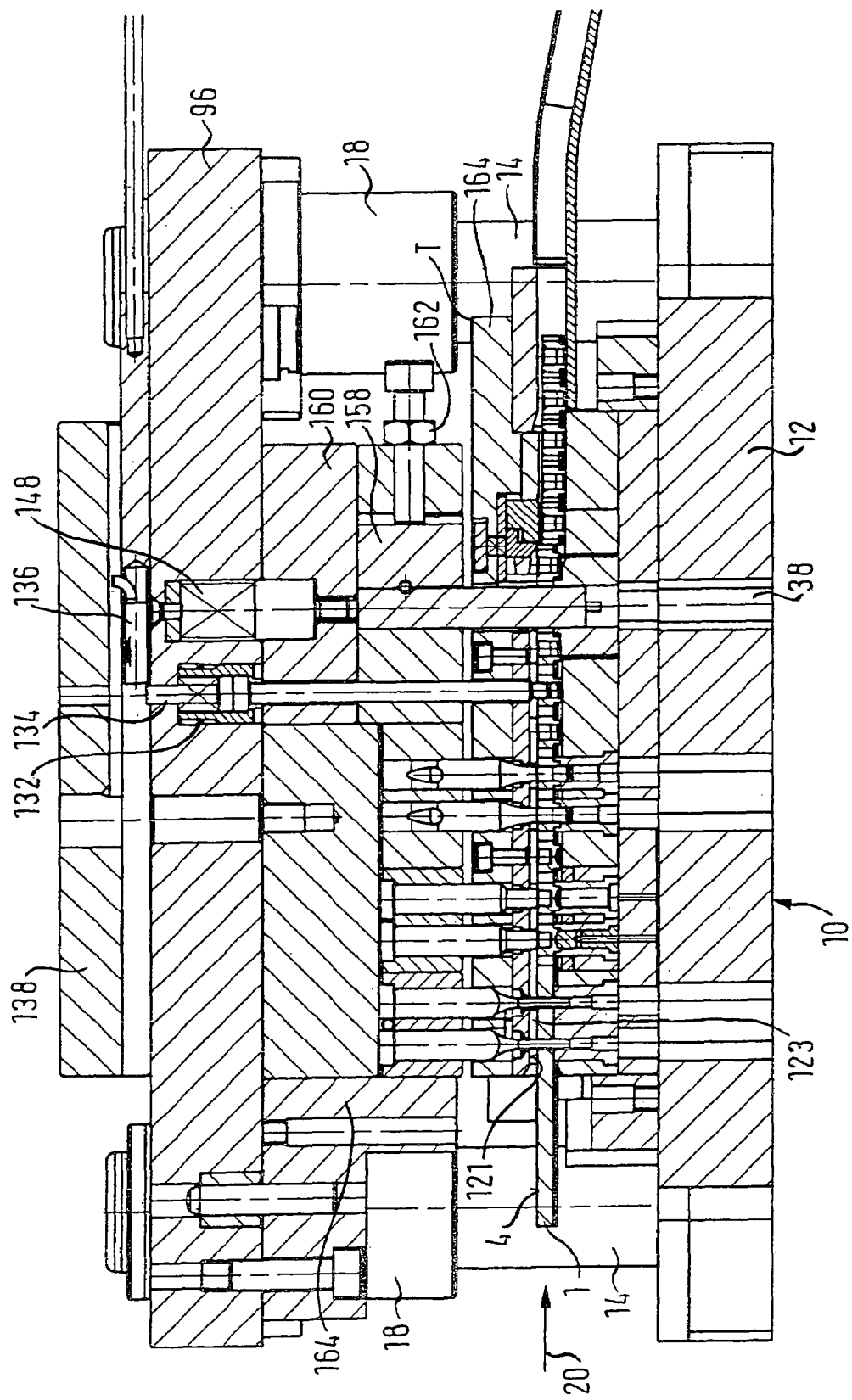
Figure 5:
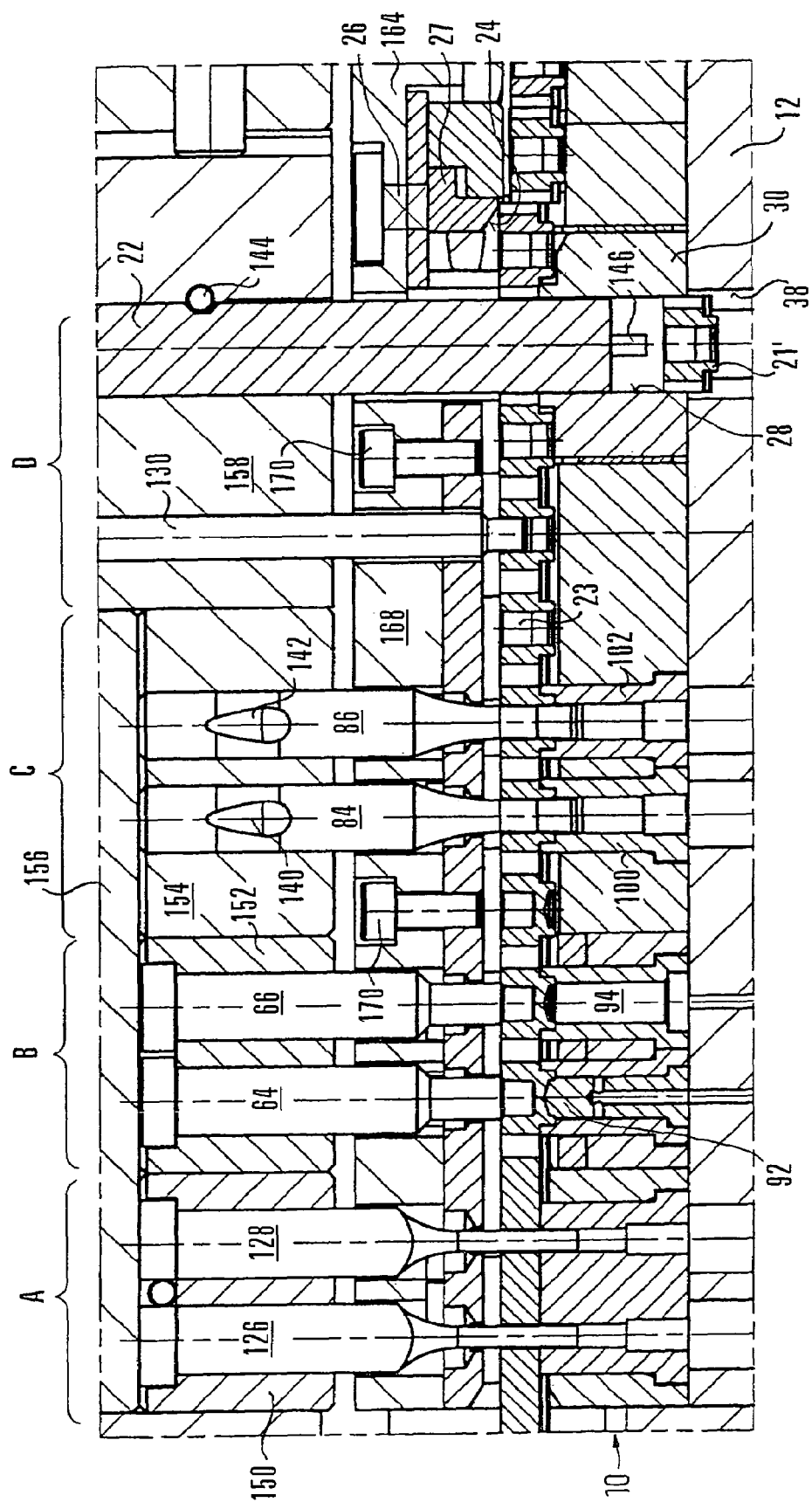

The FIGS. 4 and 5 show alternative embodiments of a progressive tool 10 which is designed to process a section which is shown in FIGS. 24A and 24C respectively.

Since the design of the progressive tool 10 of the FIGS. 4 and 5 is similar to the design of the progressive tool in accordance with FIG. 3, the same parts, or parts which have the same function, are provided with the same reference numerals. It will be understood that the description of the progressive tool in accordance with FIGS. 2 and 3 applies correspondingly for the correspondingly designated components of the embodiments of FIGS. 4 and 5. In the following only the differences will be explained.

First of all it is notable that the section 1 in the embodiment of FIG. 4 is guided in a position which is shown in FIG. 1, i.e. with the bars 2, 3 at the bottom. Furthermore, in this embodiment all punches are arranged above the sections 1 whereas the corresponding dies are located below the sections. The partition plane T is located in this example at the position indicated. The section 1 must be lifted in this embodiment which is brought about by sprung devices (not shown) and indeed the section here is lifted by the sprung devices to such a degree that the upper side 4 enters into contact with the ceiling 120 of a guide channel 122. At this point the section 1 can be advanced in the direction of advance 20 for each stroke of the press. The ceiling 120 lies between two side cheeks of the guide channel 122 which form the lateral guide for the sections.

In this embodiment the first working station A is provided with two cut-out punches 126, 128 the lower ends of which have the same shape in cross-section as the elongate holes 6 of the sections 1 of FIGS. 24A and 24C. The reference numeral 130 points to a pin which is located in contact with flat portions of the cut-out punches 126 and 128 respectively which form a security against rotation and thus ensure the correct orientation of the cut-out punches 126 and 128. In the working station B the two upsetting punches 64 and 66, which operate with corresponding dies 92 and 94, are located within the section. The working section C comprises the two hole punches 84 and 86 which cooperate with corresponding hole punch dies 100, 102.

In this example a position control pin 130 is located in a fourth working station which must engage for each stroke of the press into a bore or into an aperture in the section. If this does not succeed then one knows that the section is not correctly aligned. The determination of whether the position is correct or not takes place via this pin 130 which is pressed downwardly by a spring 132. If the position control pin 130 is pressed upwardly, because its end face strikes against the section instead of engaging into the hole, the pin 134 which is guided within the compression coil spring 132 is shifted upwardly, where it is detected by a proximity sensor 136, which then generates a switch-off signal for the press system, since, with a faulty alignment of the section 1, a fault is present and the press may not be operated. Only after the fault has been remedied can the press be taken into use again. The plate with reference numeral 138 is screwed on the one hand to the plate 16 and on the other hand to the upper tool of the press or to an intermediate plate of the press. The plate 138 thus transmits the press forces to the individual tools of the progressive tool.

The reference numerals 140, 142 show two driver pins which ensure that the hole punches 84, 86 are lifted with the upper plate. The pin 144 satisfies the same function with respect to the cut-off punch 22. The cut-off punch 22 has in this embodiment two pins 146 at its lower end which are biased downwardly by means of the compression coil spring 148. These pins ensure that the nut element 21' is pressed out of the bore 38 of the die 30 into the bore 38 of the plate 12.

The plates which carry the upper ends of the cut-out punches 126, 128, the upsetting punches 64, 66 and the hole punches 84, 86 are screwed to the plate 156 which is in turn screwed to the plate 16. The reference numeral 158 designates a guide plate for the position control pin 130 and the cut-off punch 22 and is adjustably screwed to the upwardly disposed plate 160. This is in turn screwed to the plate 16. The reference numeral 162 designates the setting device (screw with screw block and locking nut). The reference numeral 164 designates a plate which is screwed to the upper side of the guide channel 122 (see for example the screws 170) and which has various cut-outs for the cut-out punches 126, 128, for the upsetting punches 64, 66, for the hole punches 84, 86, for the cut-off punch 22 and also for the control pin 130.

A method for the manufacture of hollow body elements such as nut elements for attachment to components consisting normally of sheet metal is realized by means of the progressive tools of FIGS. 2, 3 and 4, 5 respectively. The method serves for the manufacture hollow body elements 21, 21', with an at least substantially square or rectangular outer periphery by cutting individual elements by length from a section 1 present in the form of a bar section or of a coil following the prior punching of holes 23 in the section 1, optionally with the subsequent formation of a thread cylinder, utilizing a progressive tool having a plurality of working stations A, B, C, D in which respective operations are carried out. The method is characterized in that two operations are simultaneously carried out for each stroke of the progressive tool in each working station A, B, C, D for the section 1 or, respectively, for a plurality of sections arranged alongside one another. I.e. it is basically possible to process a plurality of sections 1 alongside one another and at the same time in the same progressive tool, assuming that the corresponding number of individual tools such as upsetting punches, hole punches and the associated dies is present.

In the last working station two hollow body elements 21, 21' are respectively cut off from the section 1 or from each section 1 by means of a cut-off punch 22 for each stroke of the press.

The cut-off punch 22 cuts through the section at a first position behind a first hollow body element 21 and at a second position behind a second hollow body element 21', with the second hollow body element 21' being led out of the path of movement of the section in the direction of movement of the cut-off punch transverse to the longitudinal direction of the section 1. The first hollow body element 21 is led out at least initially in general in the direction of the path of movement of the section in the cut-off station of the progressive tool.

Each working station of the progressive tool has a length in the longitudinal direction of the section which corresponds to three times or four times or a multiple of the longitudinal dimension of a finished hollow body element 21, 21'.

In the embodiment of FIGS. 2, 3 an upsetting operation is carried out in the first working station A, a piercing operation is carried out in the second working station B, an indentation operation is carried out in the third working station C and the separation of two hollow body elements 21, 21' from the section 1 or from each section 1 is carried out by means of the cut-off punch 22 in the fourth working station D.

In the embodiment of FIGS. 4, 5 a cut-out operation is carried in the first working Station A, an upsetting operation is carried out in the second working station B, a piercing operation is carried out in the third working station C and two respective hollow body elements are separated from each section by means of the cut-off punch 22 in the fourth working station D.

The embodiment is preferably such that in the fourth working station D a position check is also carried out by means of the position control pin 130.

In the progressive tool in accordance with FIGS. 2 and 3 the indentation operation can be combined with the upsetting operation, whereby the third working station C can then be omitted.

In the progressive tool in accordance with FIGS. 4 and 5 the indentation operation can also be combined with the upsetting operation, whereby one working station is saved.

In both embodiments of the progressive tool a spring loaded cam 27 with a cam surface inclined to the path of movement of the section is pre-stressed by the front edge of the front end of the section of the outlet end of the last working station against the force of a spring device 26. After separation of the hollow body element 21 formed at the front end of the section it is tilted downwardly by the spring loaded cam in order to facilitate the removal from the progressive tool.

In the embodiment of FIGS. 2 and 3 the punches 64, 66 for carrying out the upsetting operation and the hole punches 84, 86 for carrying out the piercing operation operate from opposite sides of the section 1 on the latter. When carrying out the indentation operation indentation is effected from both sides of the sections 1 by means of respective indentation punches 68, 70, 88, 90.

In the embodiment of FIGS. 4 and 5 the punches 64, 66 for carrying out the upsetting operation and the hole punches 84, 86 for carrying out the piercing operation operate from the same side of the section 1 on the latter.

Some examples will now be given which describe the manufacture of certain hollow body elements. In the example of FIGS. 6A to 6F hollow body elements 21 are manufactured from the section corresponding to FIG. 1 which has a form similar to FIG. 4 of WO 01/72449 and a cross-sectional shape in particular in accordance with FIG. 6A.

In carrying out the upsetting operation (FIGS. 6A, 6B) the section 1 is supported at the side of the section remote from the upsetting punches 64 and 66 by respective dies 92, 94, each having a cylindrical recess 200 which, as shown in FIG. 6B has an internal diameter D which is larger than the raised portion 202 formed in the section 1 by the upsetting operation with the axial depth H of the recess being so dimensioned that the raised portion 202 produced by the upsetting operation is flat at its end face 204 but has however a rounded ball-like shape at its outer side 206.

During the piercing operation which is shown in FIGS. 6C, 6D a hole punch 84, 86 is used which has at least substantially the same diameter as the upsetting punch 64, 66.

Figure 6E:
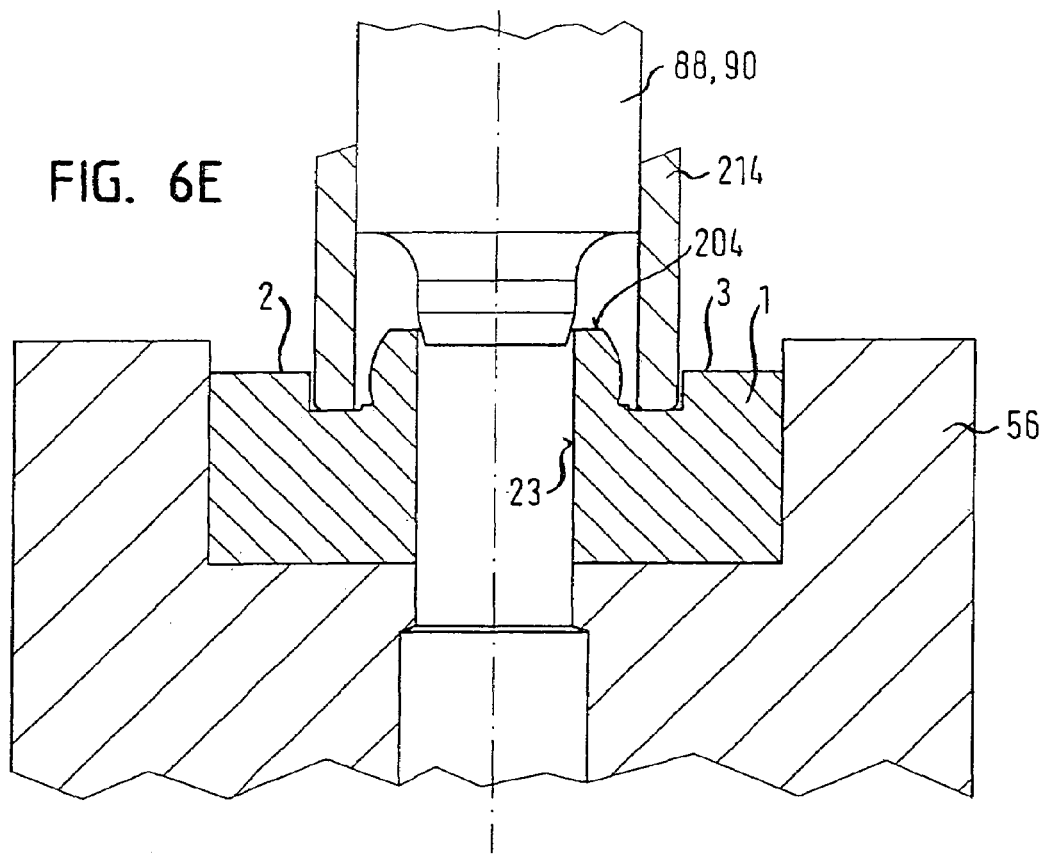
Figure 6F:
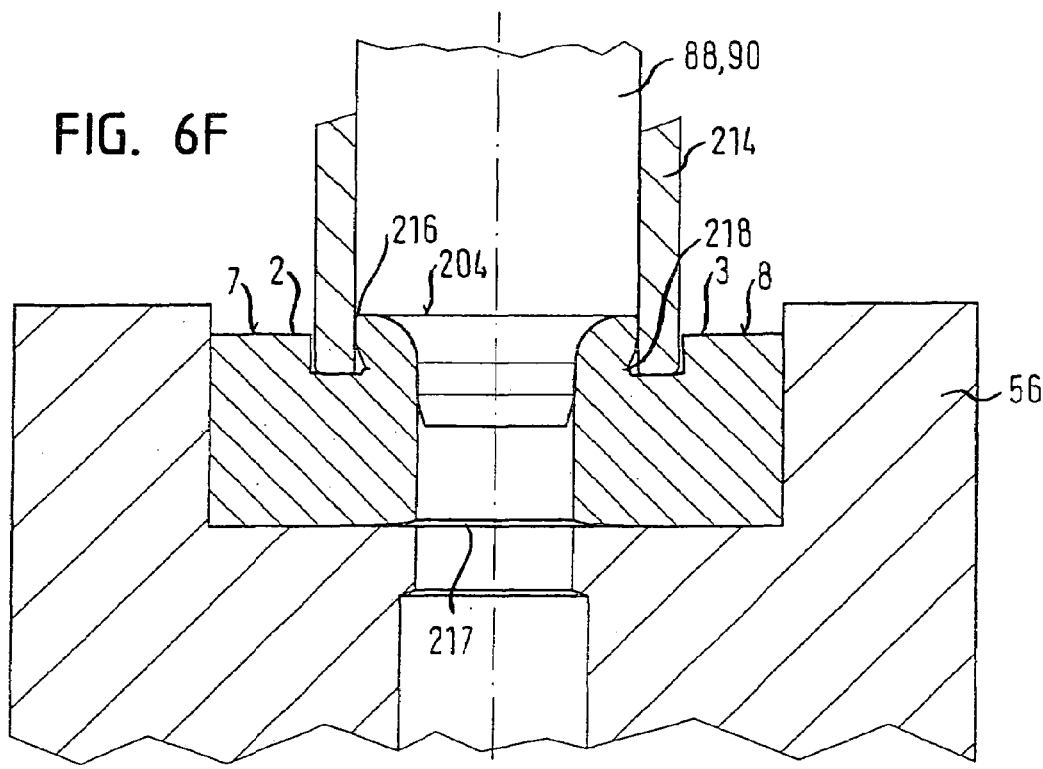
Figure 7A:
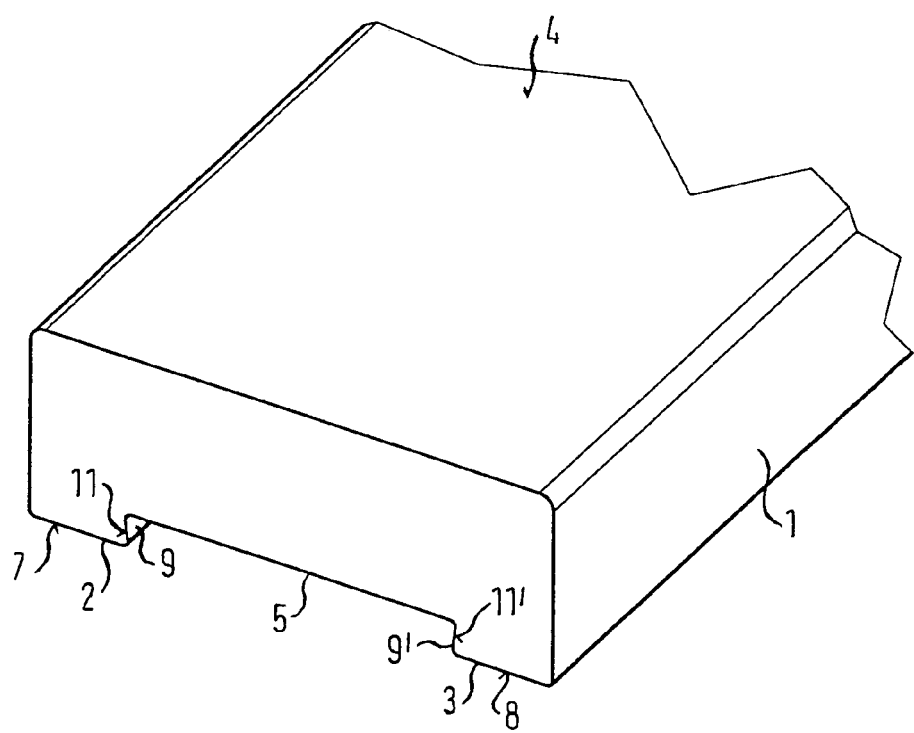

After the separation of the punched out slug 116, 118 an indentation operation is carried out in the station C in accordance with FIGS. 6E, 6F with the indentation punch 88 and 90 respectively, which acts on the end face of the raised portion produced by the upsetting operation and which is guided within a cylinder 214 which restricts the radial expansion of the raised portion and leads to an at least substantially sharp outer edge 216 of the raised portion 206 at its end face 204, which merges into an under-cut 218. One notes that the end face 204 is arranged above the upper sides 7, 8 of the bars 2, 3, i.e. projects beyond the bars, which is necessary for the self-piercing function of the hollow body element. A second indentation punch such as 68 or 70 in FIG. 3 can likewise be optionally used for the formation of the ring chamfer 216 (the second indentation punch is not shown here). Instead of the section 1 in accordance with FIG. 1 a section in accordance with FIG. 7A can be used. The section 1 is at least substantially rectangular in cross-section with two bars 2, 3 at the side which later confronts the component, which have a spacing from one another and which extend parallel to the longitudinal sides of the section and which are likewise essentially rectangular in cross-section, with the bars being separated from one another or formed by a groove 5 of rectangular cross-section which is broader in comparison to the bars and which has a depth which corresponds at least substantially to the height of the respective bars 2, 3.

Figure 7B:
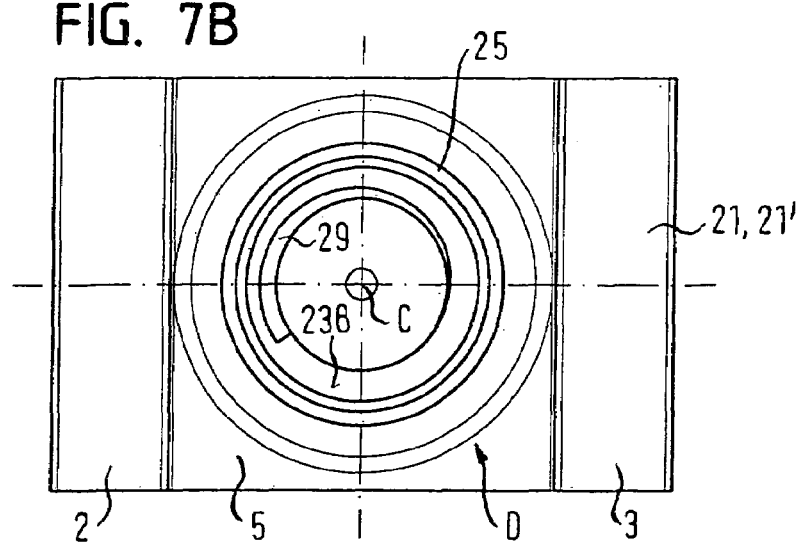
Figure 7C:
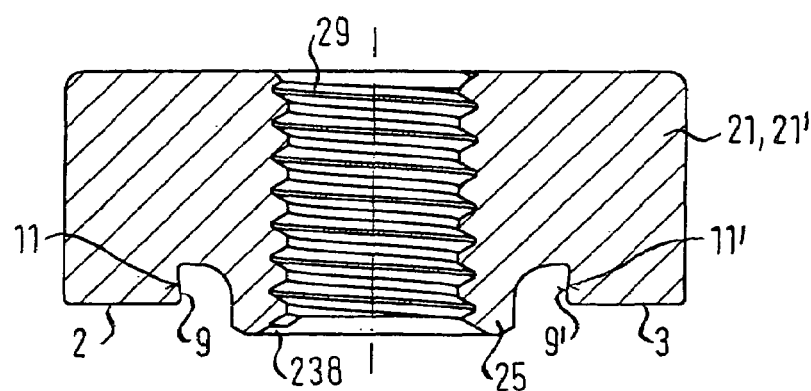
Figure 7D:
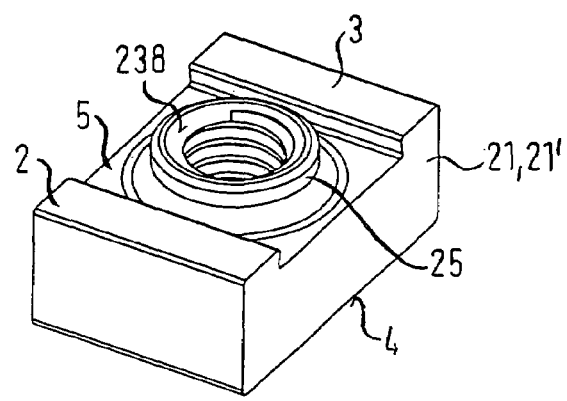

The bars each have at the inner side an obliquely inclined flank 9, 9' which forms an under-cut 11 or 11' respectively. The hollow body element is then designed as shown in FIGS. 7B to 7D. One notes from FIG. 7C that here no ring chamfer 216 is provided at the thread run-out and indeed because no indentation stamp is used during the manufacturing process which is shown in FIGS. 8A to 8E.

Figure 9:
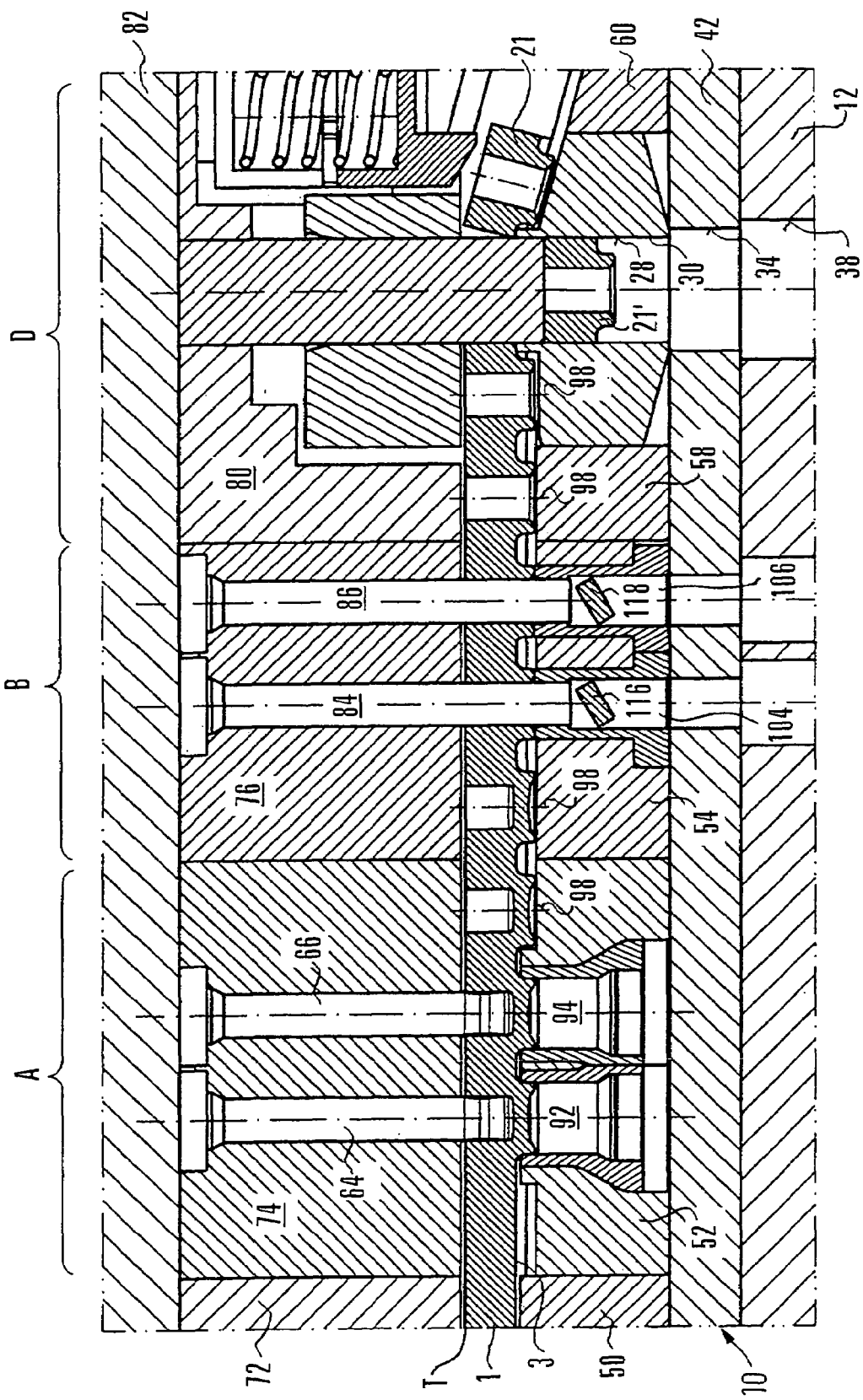

The ring chamfer 218 at the thread run-in is produced by the die 92 or 94 which is used for the upsetting operation which corresponds here to the upsetting operation in accordance to FIGS. 4, 5. The shaping of the dies 92 and 94 respectively and the significance of the manufacturing steps in the three working stations (including the cutting operation of FIG. 8D) can be seen from the FIGS. 8A to 8E and the working stations of the corresponding progressive tool 109 are shown in FIG. 9. The reference numerals in FIG. 9 correspond largely to those of FIGS. 2, 3 and the description of FIGS. 2, 3 accordingly applies also for the FIG. 9. One notes moreover that in this embodiment the ring projection of the finished element, i.e. the pilot part or piercing section 25, has no under-cut. This is not necessary because the bars are under-cut.

Furthermore, one notes that an upsetting punch 64 and 66 respectively is used having a diameter which at least substantially corresponds to the core diameter of a thread 27 which is later to be formed in the finished hollow body element and that in carrying out the upsetting operation the section is supported on a die 92, 94 with a tubular projection 230 with a rounded inner edge 232 at its end face and is provided within the ring-like projection with a pin 234 with a central projection 236 which is dimensioned in order to form a conical recess 238 in the free end face of the raised portion produced by the upsetting operation, with the recess 238 later serving as an introduction cone 238' for a bolt element introduced into the thread formed in the hollow body elements.

Figure 10A:
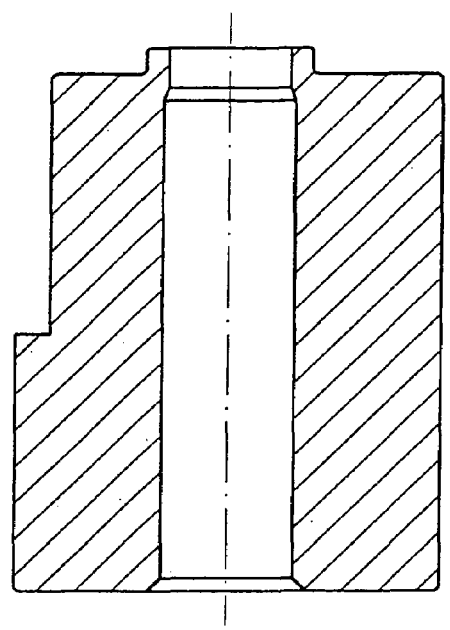
Figure 10B:
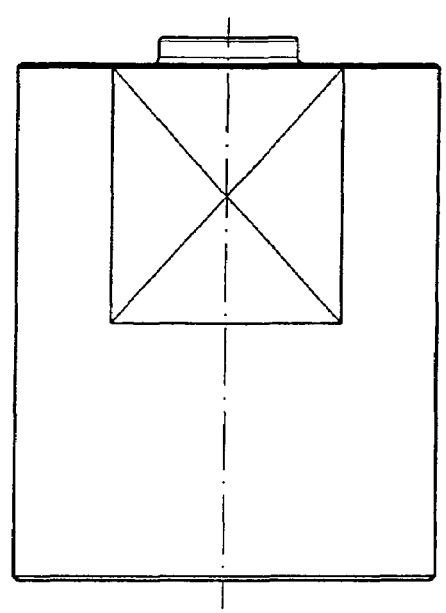
Figure 10C:
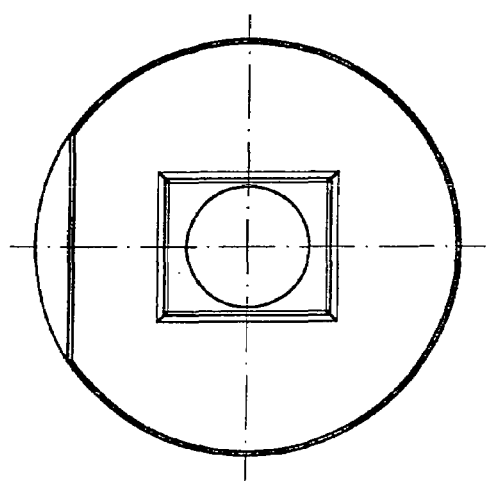

The piercing operation is carried out with a hole punch 84 and 86 respectively which has at least substantially the same diameter as the upsetting punch 64, 66 respectively. For the attachment of the finished hollow body element to a sheet metal part a die button can be used in accordance with FIGS. 10A to 10C. This process is already described in the German Utility Model 202 05 192.7 and this description also applies here.

Figure 13B:
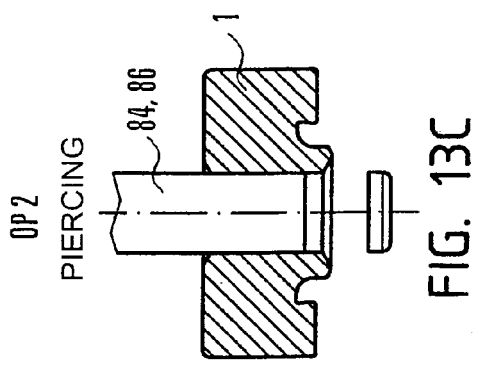
Figure 13C:
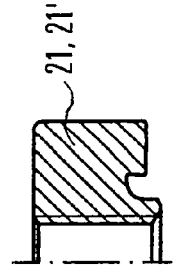

A stepped punch can also be used as an upsetting punch in accordance with FIG. 13B having a front cylindrically executed portion 250 which merges via a conical ring shoulder 252 into a rear portion 254 of larger diameter, with the conical ring shoulder 254 forming a ring chamfer (256 in FIG. 13D) in the finished hollow body element in the region of the thread run-out.

Figure 11A:
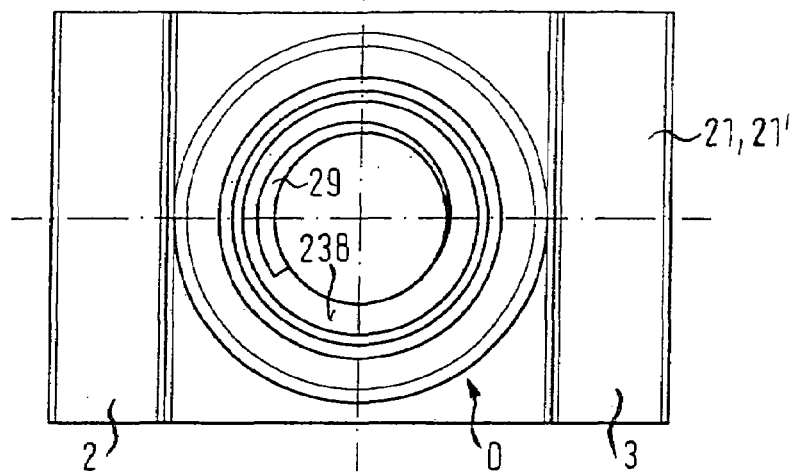
Figure 11B:
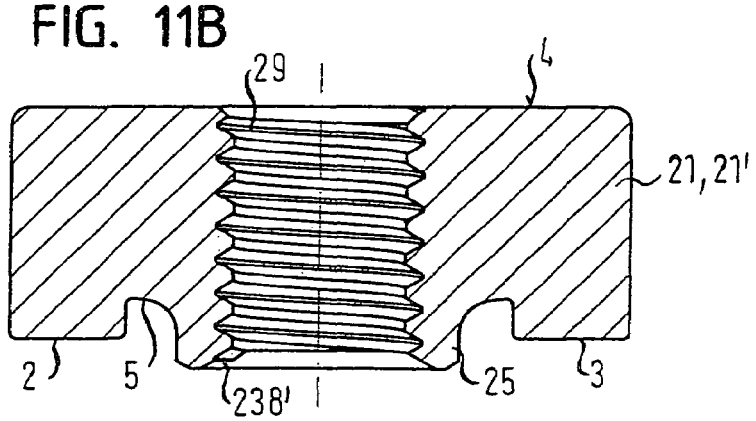
Figure 11C:
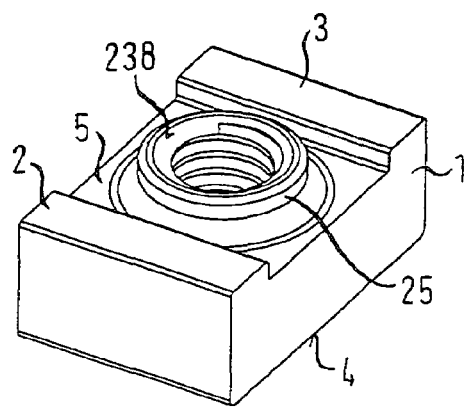
Figure 12A:
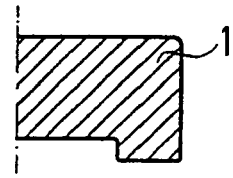
Figure 12B:
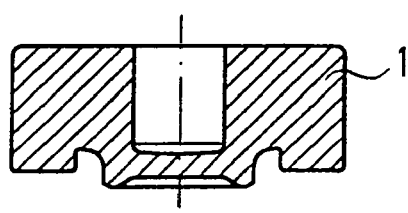
Figure 12C:
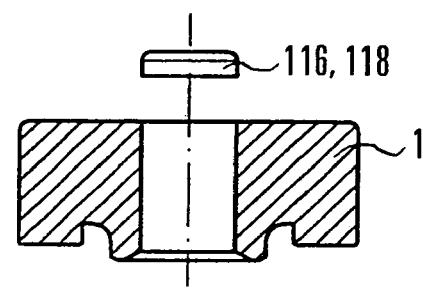
Figure 12D:
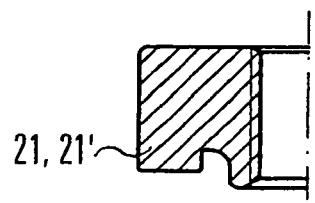
Figure 21A:
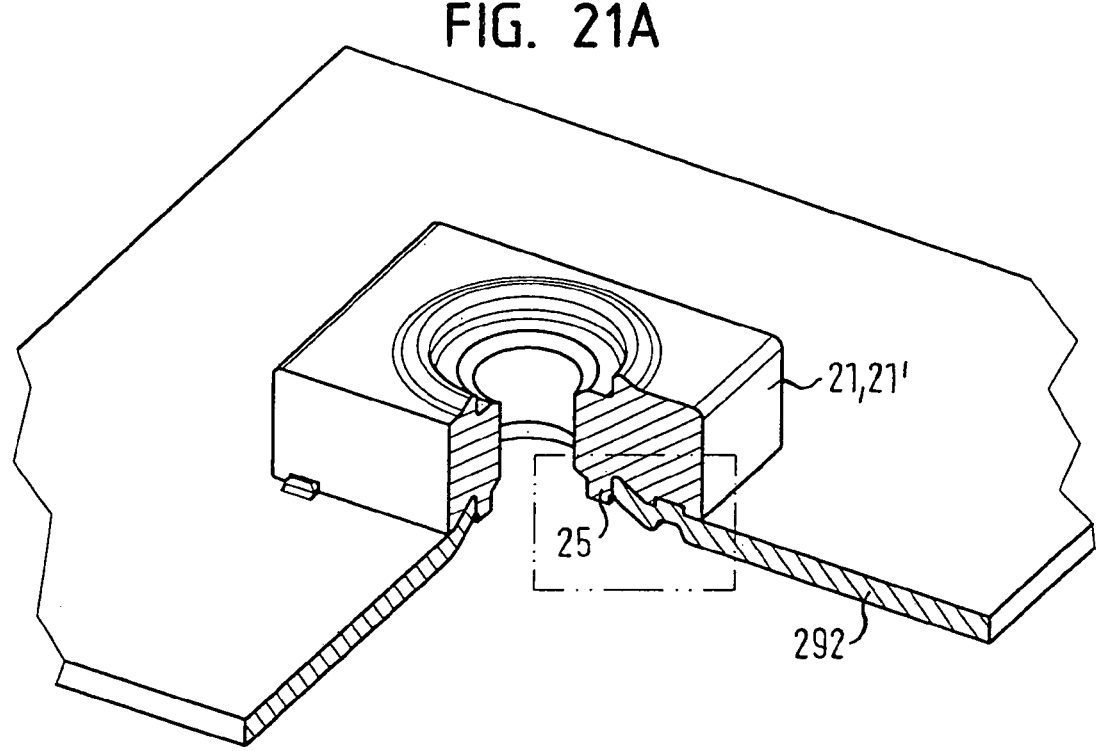
Figure 21B:
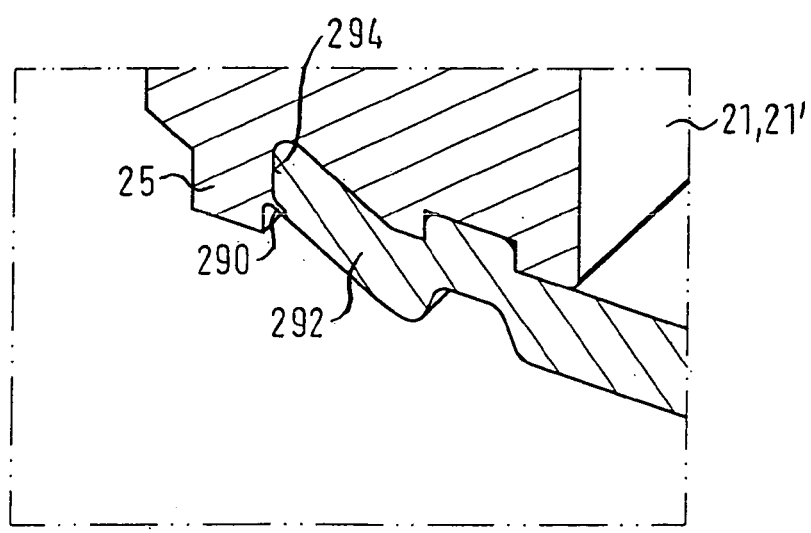

The FIGS. 11A to 11C show a hollow body element which largely corresponds to the nut element of FIGS. 7A to 7D but which was manufactured using the section 1 of FIG. 1. Thus no under-cuts can be found at the element. The element is either introduced in self-piercing manner into a sheet metal part or in non-self-piercing manner into a pre-holed sheet metal part and then, as is shown in FIGS. 21A to 21B for a different example, a ring-like bead 290 is formed by the displacement of material from the end face of the pilot part 25 by means of a suitable die button which produces an under-cut and clamps the sheet metal part 292 in the region of the edge 294 of the pierced hole between itself and the base 5 of the groove.

Instead of a ring-like bead discrete material noses could also be used which are likewise formed by the displacement of material from the end face of the pilot part 25 by means of a suitable die button, as known per se.

Figure 13A:
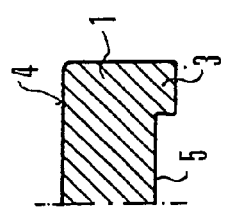
Figure 13D:
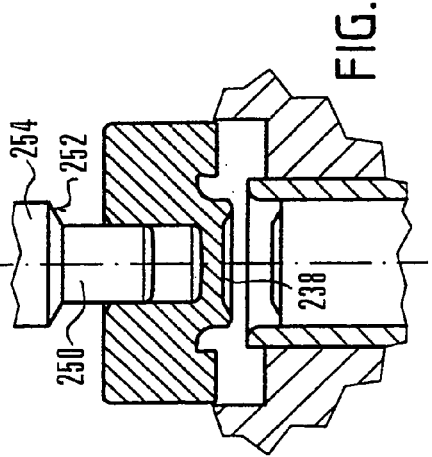
Figure 13E:
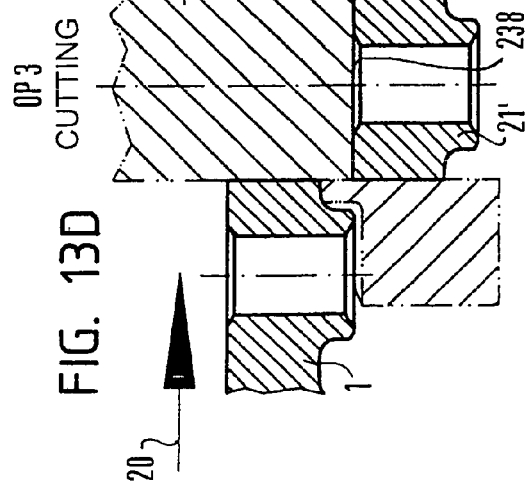

The FIGS. 12A to 12D show how the element of FIGS. 11A to 11C can be manufactured by operating from opposite sides of the section 1 analogous to the FIGS. 2 and 3 and indeed with only three working steps (upsetting, piercing and cut-off (cut-off not shown). In this connection the upsetting operation can be combined with the formation of the chamfer which is shown in FIGS. 13A to 13A, above all in FIG. 13B, with the FIGS. 13A to 13E showing the processing of the sections with the upsetting punch and with the hole punch on the same side of the sections 1.

Should a ring chamfer be desired at the thread run-out, it can be produced by the use of a hole punch of a conical ring shoulder, as is shown in the variant of FIGS. 14A to 14E, above all in FIG. 14C. Instead of this a ring chamfer can also be produced at the thread run-out by an additional working step, as is shown in the embodiment of FIGS. 15A to 15F. For this purpose a chamfer punch is used in FIG. 15D.

Figure 16:
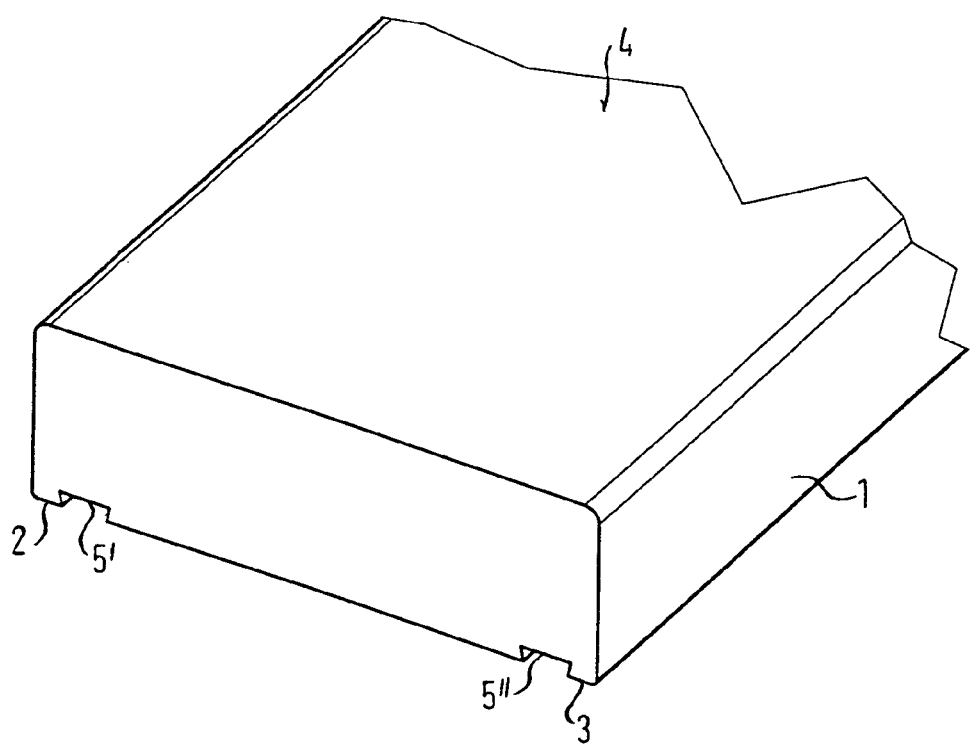
Figure 18A:
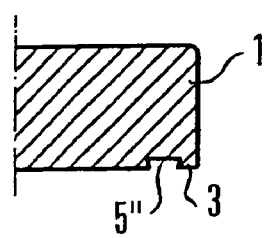
Figure 18C:
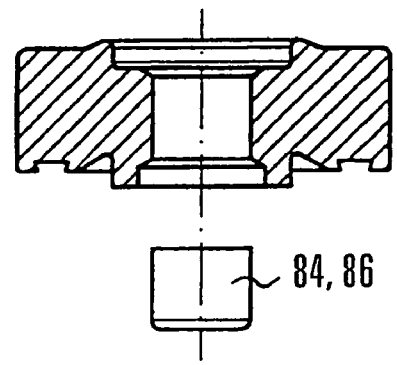
Figure 18B:
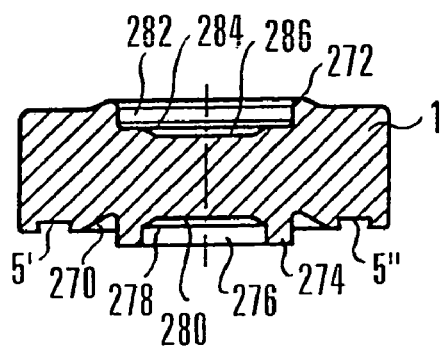
Figure 18D:
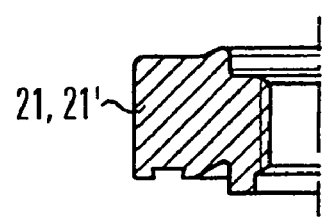

A section 1 in accordance with FIG. 16 can also be used. Here two bars 2, 3 are provided which are bounded or formed by respective grooves 5', 5" which likewise extend parallel to longitudinal sides of the section, which have an at least substantially rectangular cross-section and also a depth which corresponds to the height of the bars, with the one side of each groove 5', 5" which forms an inner flank of the respective bar 2 and 3 and also the second side of each groove 5', 5" being inclined so that a dovetail-like groove cross-section is present.

When the section of the FIG. 16 is used an element 21, 21' in accordance with FIG. 17A to 17E can be manufactured. This element corresponds essentially to the element in accordance with FIGS. 9A to 9E of the German Utility Model 202 05 192.7 apart from the special dovetail-like design of the grooves. This section can also be processed in a progressive tool having only three working stations including the cut-off station. The method is shown in FIGS. 18A to 18D, although the cut-off operation is not illustrated because this step is carried out as previously.

In a first upsetting operation a conical recess 270 is produced in the region of the section 1 between the two grooves 5', 5" with a conical raised portion 272 simultaneously arising at the side of the section 1 opposite to the recess 270. Within the conical recess 270 a cylindrical projection 274 with a central recess 276 is simultaneously produced which merges via a conical ring shoulder 278 into a base surface 280. At the side of the conical raised portion 272 the latter has a cylindrical recess 282 at the centre which has a conical ring surface 284 which merges into a base surface 286. The upsetting punch and the upsetting die (both not shown) are correspondingly shaped at their free ends in order to achieve the said shaping of the hollow body element.

Figure 19A:
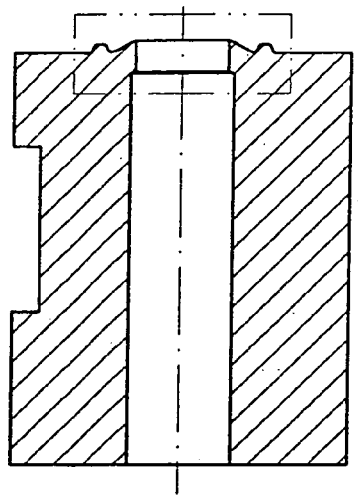
Figure 19C:
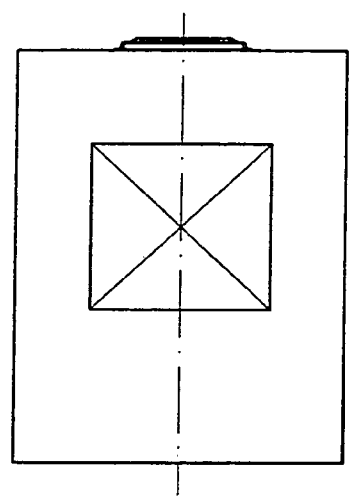
Figure 19B:
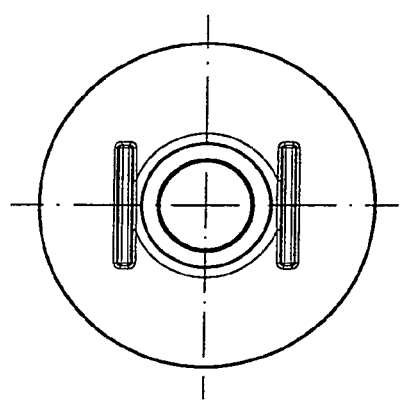
Figure 19D:
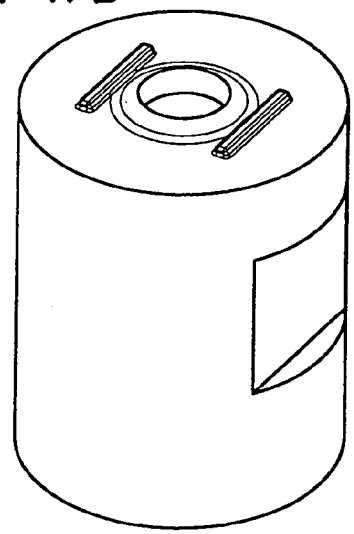
Figure 19E:
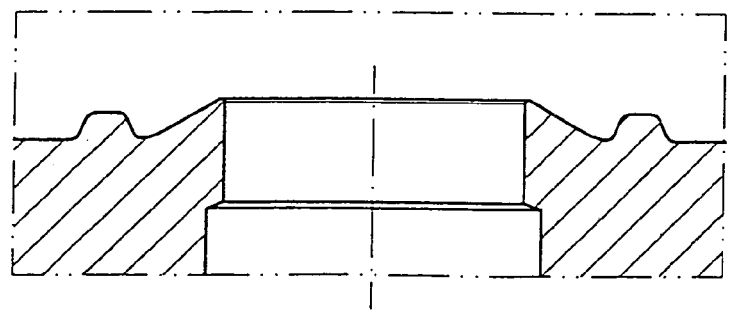
Figure 20A:
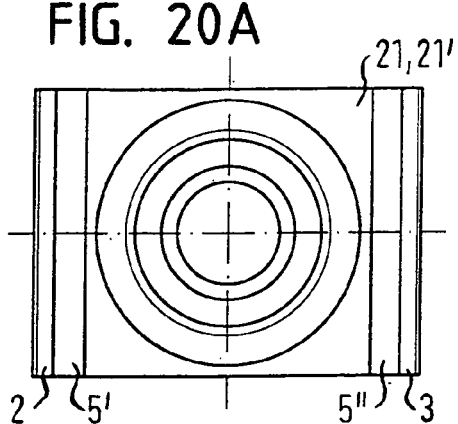
Figure 20D:
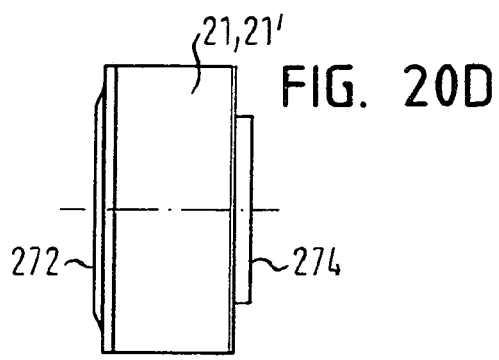
Figure 20B:
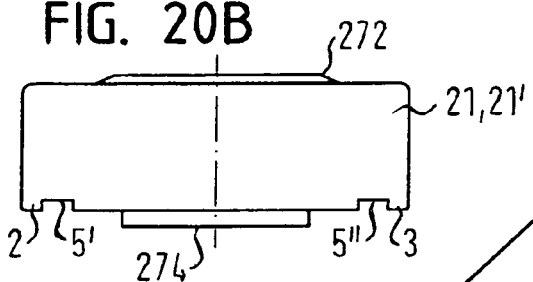
Figure 20E:
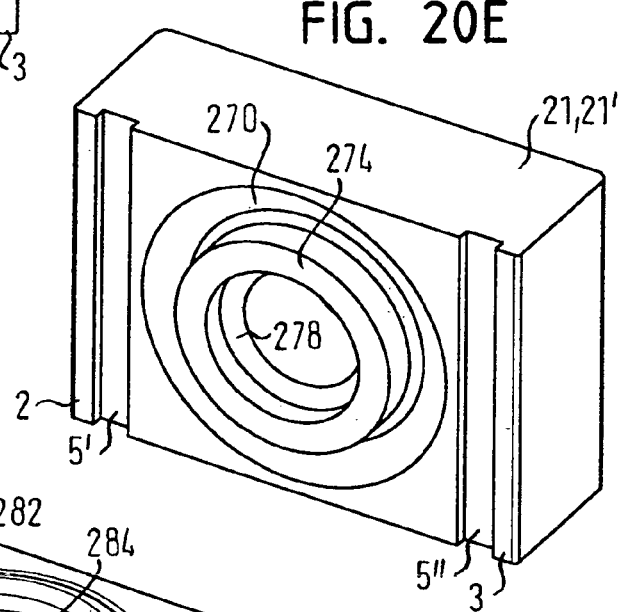
Figure 20C:
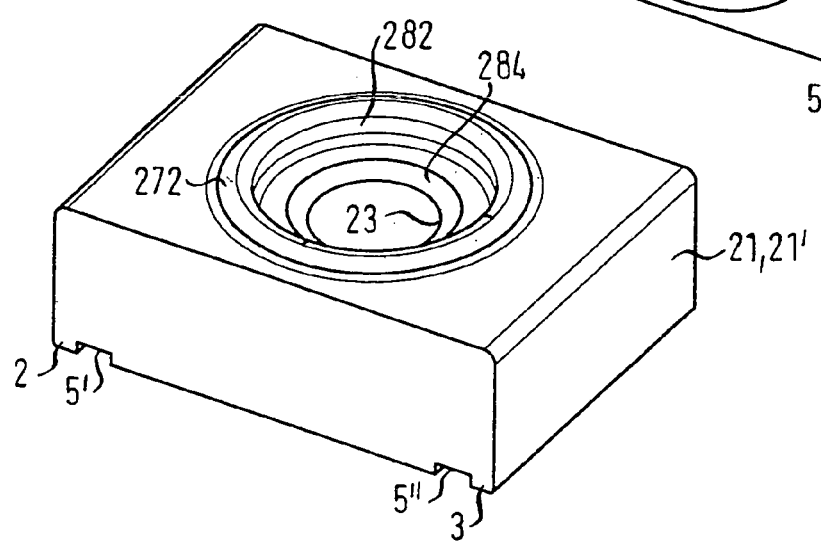

After the upsetting operation a piercing operation is carried out by means of a hole punch and subsequently the elements are separated from the section and, if required, a thread is produced in the pierced region. The conical ring shoulder 278 at the side of the conical recess 270 and the conical ring shoulder 284 at the side of the conical raised portion 272 form an entry aid for a bolt and a ring chamfer at the thread outlet respectively. The die button for the attachment of the hollow body elements to a sheet metal part is shown in FIGS. 19A to 19C and corresponds largely to the die button of FIGS. 12A to 12B of the named WO document.

Instead of using the section in accordance with FIG. 16 a section in accordance with FIG. 8 of WO 01/72449 can be used in which the sides of the grooves which form the inner flanks of the bars and the outer flanks of the central region of the section stand perpendicular to the under-side or upper-side of the section. The shape of the finished hollow body element corresponds to the shape shown in FIGS. 20A to 20E, with this shape in turn having the shape of the hollow body elements of FIGS. 9A to 9E of the named WO document, apart from the shaping of the pilot part 25 which does not have any under-cut here. The element is secured to the sheet metal part in accordance with FIGS. 21A and 21B, which have already been described above.

Figure 22A:
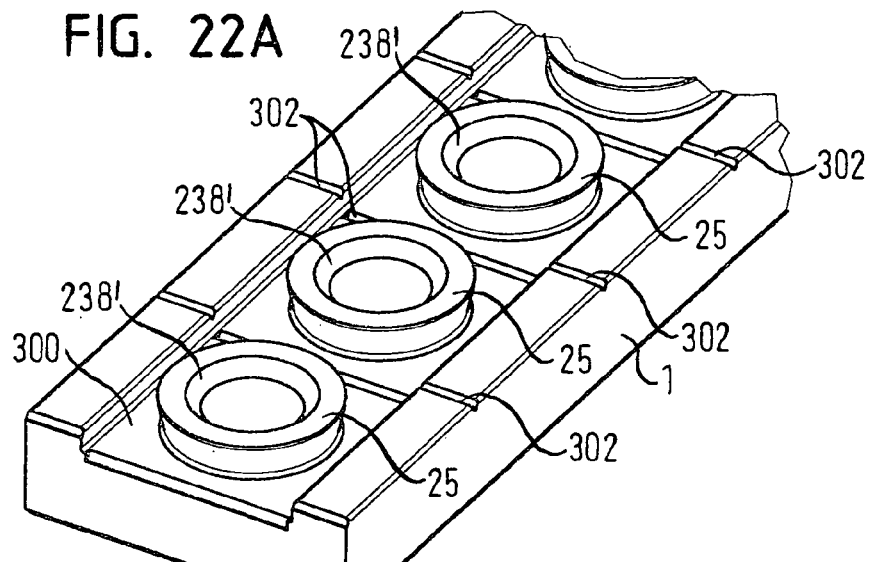
Figure 22B:
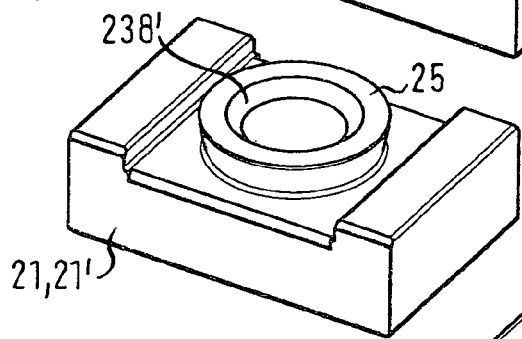
Figure 22C:
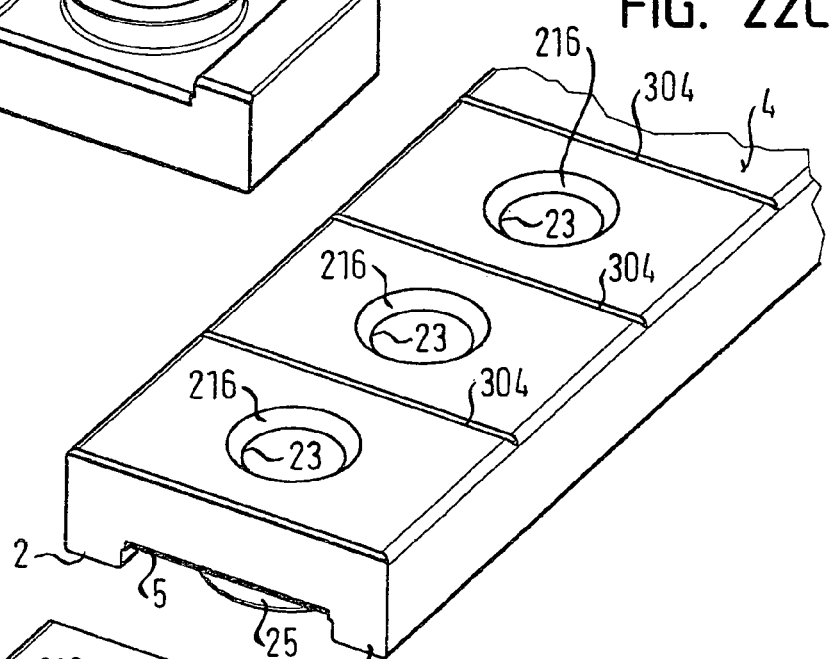
Figure 22D:
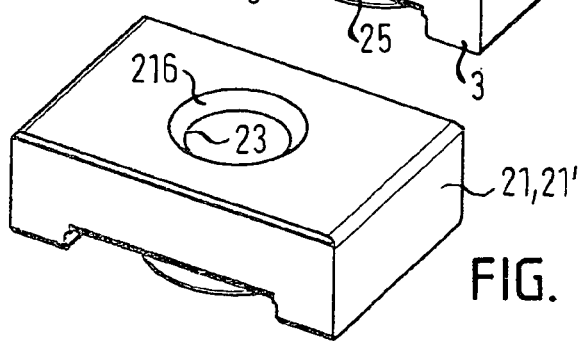

It is particularly favorable when a section 1 in accordance with FIG. 22A or FIG. 22C is used. Here the section 1 has, prior to the separation of the hollow body elements from the section, transversely extending notches 302 and 304 at the side 300 confronting a component when attaching the hollow body elements to a component and/or at the opposite side 4 respectively. These notches 302 and/or 304 are present at positions at which the finished hollow body elements 21, 21' are separated from the section, whereby the notches so to say form weak points at the intended points of separation. The notches 302 and 304 can be produced in the progressive tool, for example in a further working station or combined with one of the already provided working steps. Instead of this they can be rolled into the section 1 during its manufacture or can be provided in a different manner.

Furthermore, the possibility exists of not separating the hollow body elements from one another in the progressive tool but rather retaining or using the section 1 after manufacture of the general shape of the hollow body elements in sections or in re-coiled form and for a separation into individual hollow body elements 21, 21' can then first take place when the section 1 is used in a setting head for the attachment of the hollow body elements to a component. This procedure would facilitate the supply to the setting head.

Figure 23A:
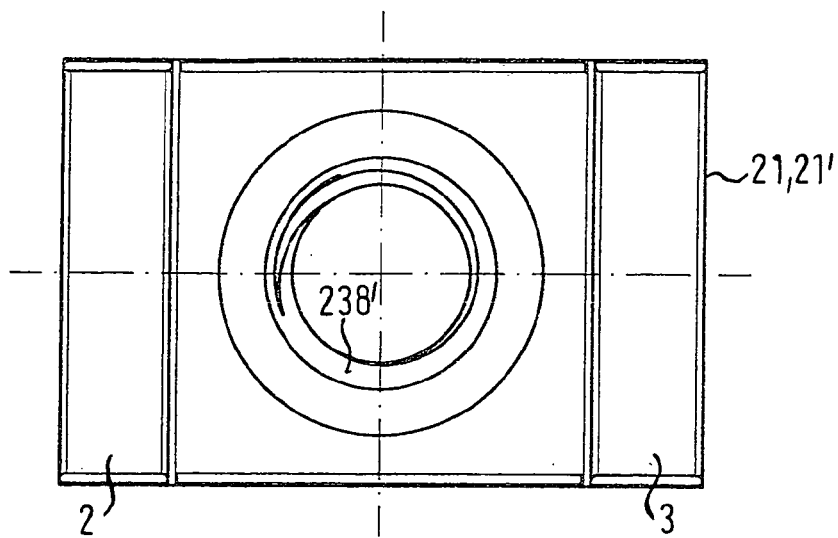
Figure 23B:
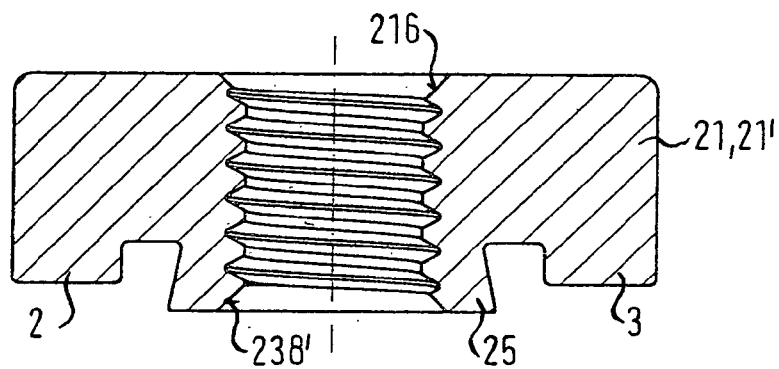
Figure 23C:
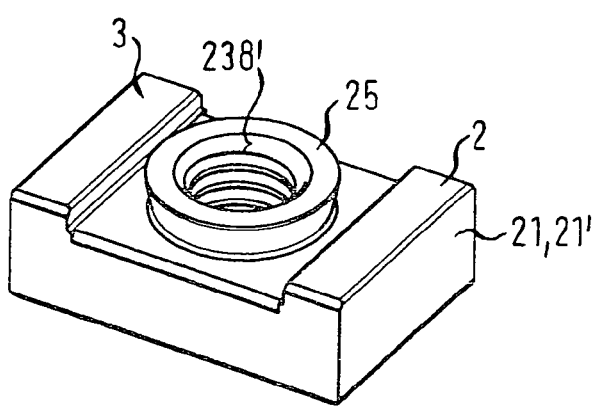
Figure 25A:
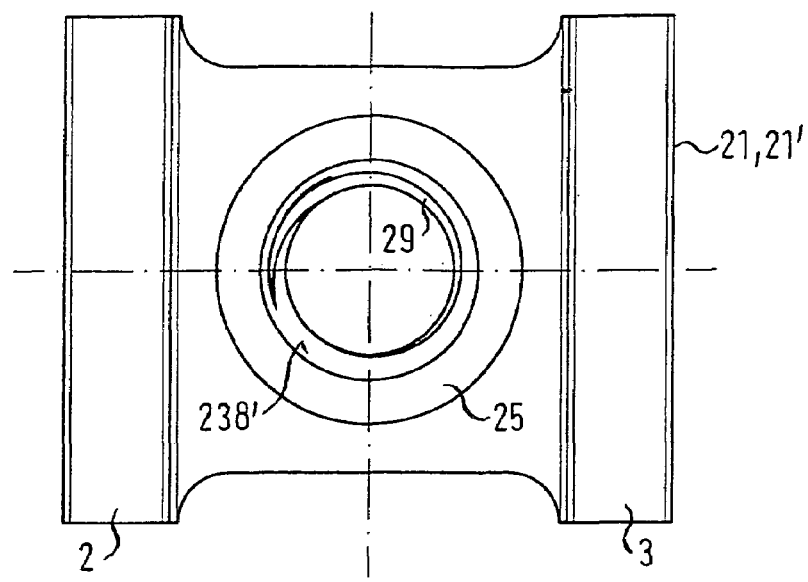
Figure 25B:
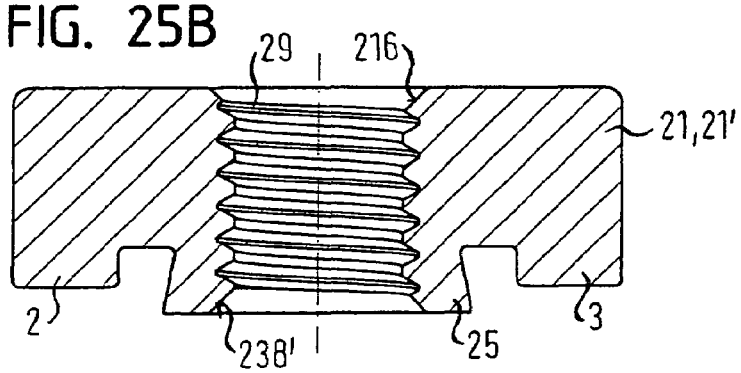
Figure 25C:
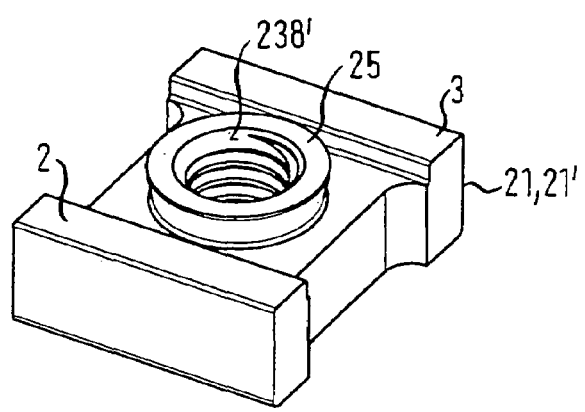

The concept of the notches can also be used with other sections, for example with all the sections described in this application or in the prior art. When using a section in accordance with FIG. 1 hollow body elements in accordance with FIGS. 23A to 23C could be produced.

Figure 26A:
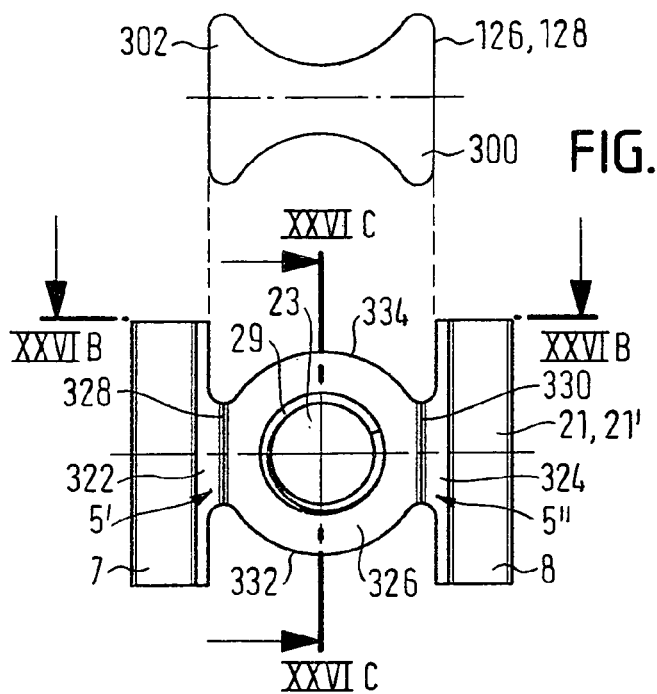
Figure 26C:
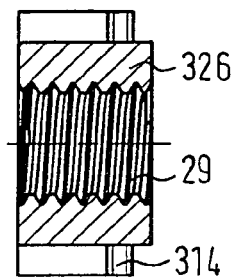

Furthermore, the possibility exists of producing sections in accordance with FIGS. 24A and 26A. For this purpose the progressive tool in accordance with FIGS. 4 and 5 is used. Here a cut-out procedure is used in the working station A in order to pierce holes in the section at the boundaries between the individual hollow body elements which have not yet been separated from one another, for example elongate holes 6 or a plurality of holes of circular cross-section which are arranged transverse to the longitudinal direction of the section, i.e. in rows transverse to the longitudinal direction of the section, in order to facilitate the later separation of the hollow body elements 21, 21' by means of the cut-off punch 22. In this embodiment a cut-out operation is preferably carried out as a first working step in the progressive tool 10.

In an embodiment of this kind it is also not necessary to separate the hollow body elements from one another in the progressive tool but rather the section can be retained or used after manufacture of the general shape of the hollow body elements in sections or in pre-coiled shape, with a separation into individual hollow body elements first taking place when the section is used in a setting head for the attachment of the hollow body elements to a component.

The elongate hole 6 or the row of cylindrical holes (not shown) should preferably not extend into the regions of the section in which the bars 2, 3 or 7, 8 are provided, because the length of the bars is of significance for the security against rotation, it would however be permissible to provide a hole in each bar region, providing the bars are not undesirably shortened in this way.

Figure 26B:
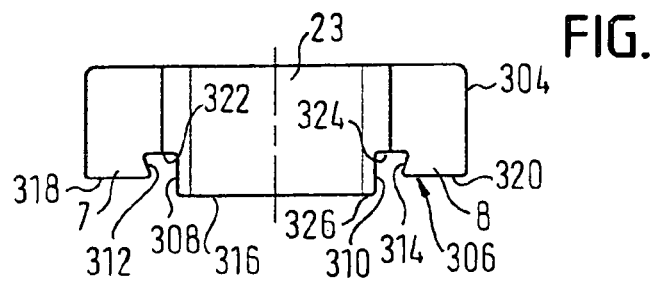
Figure 26D:
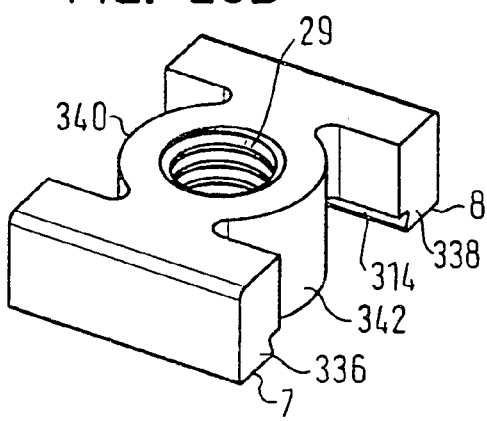
Figure 26E:
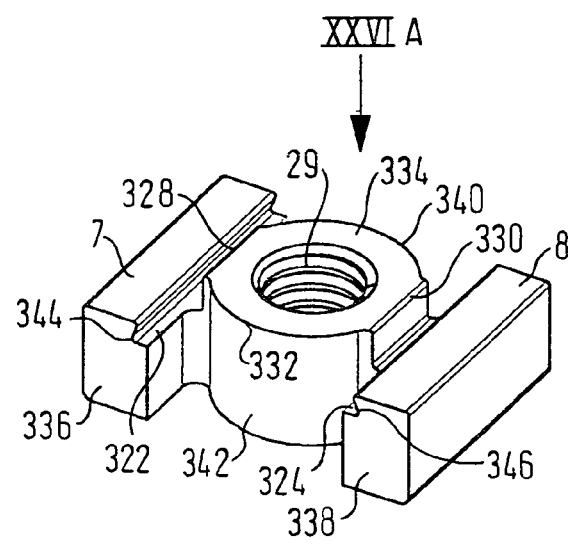
Figure 27A:
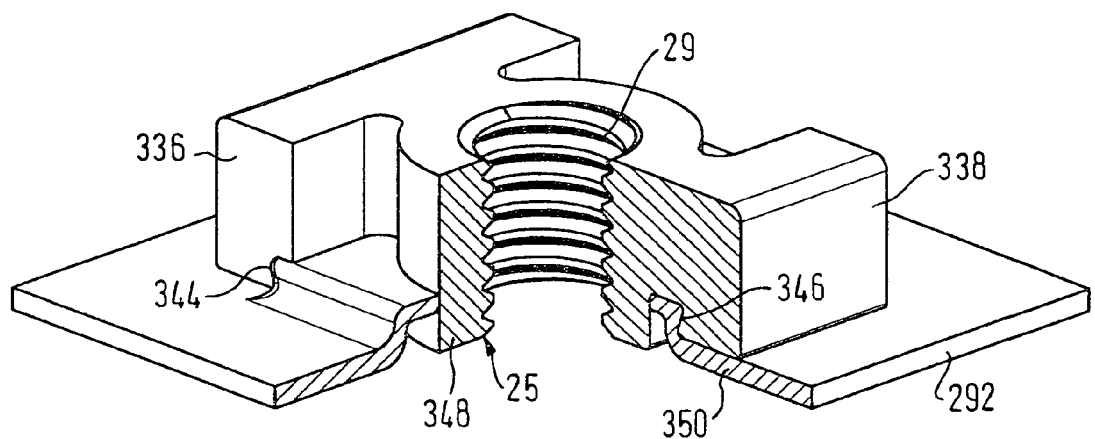
Figure 27B:
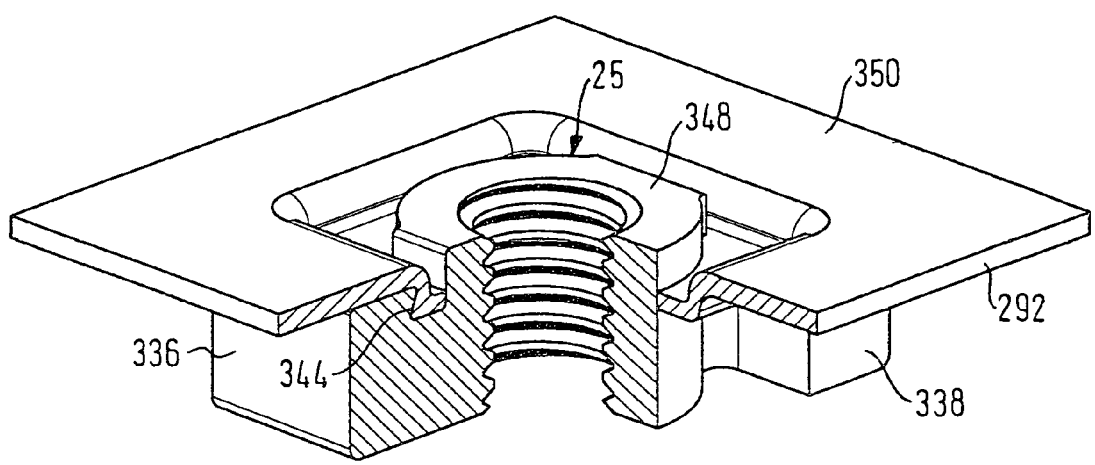

The FIGS. 26A to 26E show a further example of a hollow body element in accordance with the invention, with the FIGS. 27A and 27B showing the same element after attachment to a sheet metal part. The hollow body element of FIGS. 27A and 27B is produced using the apparatus of FIG. 5 and indeed using cut-out punches 126, 128 which each have a cross-section with the shape of an hour glass or of a bollard.

This cross-sectional shape is drawn in in FIG. 26A. It is evident that the cut-outs above and below the central part of the hollow body element 21 have in plan view in each case the shape of the half cross-section 300 and 302 respectively of the cut-out punch.

The method is preferably carried out with a section which in cross-section has the shape which is given by the outer periphery 304 of FIG. 26B. As evident there the cross-section is at least substantially rectangular with two bars 7, 8 at the component side 306 which later confronts the component 292 (FIGS. 27A and 27B), with the bars having a spacing from one another, extending parallel to the longitudinal sides of the section and being likewise at least substantially rectangular in cross-section. The bars are bounded at the inner side by respective grooves 5', 5" which like-wise extend in the longitudinal direction of the section. The respective inner side 308, 310 of the grooves are higher than the respective outer sides 312, 314 which bound the respective bars, whereby a projection 316 of rectangular cross-section is present in the central region of the longitudinal side of the section, with the side of the projection confronting the component projecting further than the sides 318, 320 of the bars confronting the component. The respective outer sides 312, 314 of the grooves are inclined for the formation of under-cuts. It would however also be conceivable to likewise place the respective inner sides 308, 310 of the grooves, or instead of the outer sides of the grooves, in an inclined position in order to form under-cuts.

In other words, for the formation of grooves with at least one under-cut in each case, the respective outer-sides 312, 314 of the grooves 5', 5" and or the respective inner sides 308, 310 of the grooves are inclined towards one another or away from one another respectively, starting from the base 322, 324 of the grooves which preferably extend parallel to the said component side. With a cross-sectional shape of this kind of the section that is used the manufacture of the hollow body elements is simplified, because the shape of the projection at the finished manufactured hollow body element is determined by the section that is used and the cross-sectional shape of the cut-out punch and not by deformation of the section. It is merely necessary to produce the hole in the central region of the web of the hollow body element which is approximately I-shaped in plan view by indentation and piercing operations. These operations ensure through cold deformation an increased strength of the hollow body element in the region of the subsequently formed thread 29.

Instead of using a section with a cross-sectional shape in accordance with the reference numeral 304, FIG. 26B one can also use the section of FIG. 1 and produce the projection 25 with a corresponding upsetting operation. I.e. in this example a section is used which is at least substantially rectangular in cross-section with two bars 7, 8 at the component side which later confronts the component, with the two bars having a spacing from one another extending parallel to the longitudinal sides of the section and being likewise at least substantially rectangular in cross-section. These bars are separated from one another or formed by a groove 5 of rectangular cross-section which is broader in comparison to the bars and which has a depth which corresponds at least substantially to the height of the respective bars.

Other sections could also be used in which cut-outs are produced by cut-out punches as described in connection with FIGS. 24 to 27. E.g. the section could be a rectangular section without bars or a rectangular section with a central rectangular bar such as 316 in FIG. 26. The central bar 316 could then form sides equivalent to 308 and 310 in FIG. 26 which would provide security against rotation after insertion of the element into a sheet metal component. They could also be inclined, as discussed above in connection with FIG. 26 to provide undercuts and security against push out when the hollow body element formed from the section are attached to a sheet metal part. If the sides corresponding to 308 and 310 are not inclined to provide an undercut, security against push out could also be achieved by deforming or staking metal from the pilot portion 25 to overlap the sheet metal component as discussed in connection with other embodiments above.

Since the section of FIG. 1 uses bars 7, 8 which have no inclined inner side the projection 25 must be produced with an under-cut, for example in accordance with the FIGS. 6A, 6F. Alternatively a section similar to FIG. 1 can be used, in which however the inner sides of the bars, i.e. the sides of the groove 5 are inclined to the base surface of the groove 5 in order to form undercuts. I.e. the bars each have at the inner side an inclined flank which forms an undercut. This embodiment can be realized with a projection 25 which either has an undercut or no under-cut.

The result of the different manufacturing methods is preferably such that a projection 25 is formed at the centre of the hollow body element at the component side 306. The end face 326 of the projection 25 which is formed as a punch section projects beyond the level of the sides of the bars confronting the component and has in plan view in the region of these bars edges 328, 330 which extend parallel to them. These are connected to one another by two part circular edges 332, 334 which correspond to the side shape of the cut-out punch and extend concentrically to the central aperture 23 of the element.

The hollow body element for attachment to a component 292 consisting in particular of sheet metal thus has bars 7, 8 extending parallel to one another at two opposite sides which together with the component 292 form a security against rotation and a centrally arranged aperture 23 extending perpendicular to the component side which can optionally have a thread cylinder 29. It is characterized in that a ring-like projection 25 is present at the component side 306 of the hollow body element 21, 21' facing the component and concentric to the aperture 23 which is formed as a piercing section with or without an under-cut. Furthermore, the projecting piercing section 25 has in the region of each bar 7, 8, in plan view, a respective edge 328, 330 which extends at least substantially parallel to the adjacent side wall 312, 314 of the respective bar 7, 8. Between the bars 7, 8 and the projecting piercing section 25 there are respective recess regions 322, 324. The mutually confronting side surfaces 312, 314 of the bars 7, 8 each form a respective under-cut and/or the piercing section 25 has an under-cut. The hollow body element is at least substantially I-shaped in plane view, with the central web 340 connecting the transverse bars 336, 338 of the I-shape being at least substantially circular in plan view and being formed by a cylindrical region 342 of the web 340.

It is evident from the section drawings of FIGS. 27A and 27B that the sheet metal material is formed by application of a correspondingly shaped die (not shown) into the grooves 5', 5" and into the under-cuts 344, 346 adjacent to the bars 7, 8 and the element 21, 21' is thus secured against press-out forces with the bars simultaneously serving for a high security against rotation.

Furthermore, it is evident that the end face 348 of the piercing section 25 lies in a plane with the sides 350 of the sheet metal part remote from the hollow body element so that a good screw-on situation results. Furthermore, it is evident that the sheet metal deformations in the regions of the piercing section 25 are all rounded so that a good resistance against fatigue is to be expected.

In all embodiments all materials can be named as an example for the material of the section, and for the functional elements manufactured from it, which in the context of cold deformation achieve the strength values of class 8 in accordance with the ISO standard or higher, for example a 35B2 alloy in accordance with DIN 1654. The so formed fastener elements are suitable amongst other things for all commercially available steel materials for drawing quality sheet metal parts and also for aluminum and its alloys. Moreover aluminum alloys in particular those of higher strength can be used for the section or for the functional elements, for example AlMg5. Also sections or functional elements of higher strength magnesium alloys such as for example AM50 can be considered.

The invention claimed is:

1. A method for the manufacture of hollow body elements (21, 21') using a progressive tool (10) having a plurality of working stations (A, B, C, D) in which respective operations are carried out, said hollow body elements having an at least substantially square or rectangular outer periphery and being for attachment to a component normally consisting of sheet metal (292) the method comprising the steps of cutting individual elements by length from a section present in the form of a bar section (1) or a coil and extending in a longitudinal direction by using a cut-off punch following prior punching of apertures (23) in the section and optionally after subsequent formation of a thread cylinder (29) and carrying out two operations on the section (1) in each working station (A, B, C, D) at the same time for each stroke of the progressive tool, wherein the cut-off punch (22) cuts the section (1) in a cut-off operation at a first position behind a first hollow body element (21) and at a second position behind a second hollow body element (21'), with the second hollow body element being led away in a direction transverse to said longitudinal direction of the section.

2. The method in accordance with claim 1, wherein said first hollow body element (21) is led out, at least initially, in general in said longitudinal direction of the section (1).

3. The method in accordance with claim 1, wherein each working station (A, B, C, D) is selected with a length in the direction of movement (20) of the section (1) which corresponds to three times or four times or an integral multiple of the length dimension of a finished hollow body element (21, 21').

4. The method in accordance with claim 1, wherein an upsetting operation is carried out in a first working station (A), a piercing operation is carried out in a second working station (B), an indentation operation is carried out in a third working station (C) and the cut-off operation for the cutting off of two hollow body elements (21, 21') from said section (1) is carried out by means of the cut-off punch (22) in a fourth working station (D).

5. The method in accordance with claim 1, wherein a cut-out operation is carried out in a first working station (A), an upsetting operation is carried out in a second working station (B), a piercing operation is carried out in a third working station (C) and the cut-off operation for the cutting off of two hollow body elements from said section is carried out in a fourth working station (D) by means of the cut-out punch.

6. The method in accordance with claim 5, wherein the cut-off operation is carried out in a fifth working station instead of in the fourth working station (D) and in that a positional check is carried out in the fourth working station (D).

7. The method in accordance with claim 4, wherein the indentation operation is combined with the upsetting operation and the third working station is omitted.

8. The method in accordance with claim 5, wherein the indentation operation is combined with the upsetting operation and the third working station is omitted.

9. The method in accordance with claim 1, wherein the section (1) is advanced for each stroke of the progressive tool by a length which corresponds to twice the length of a single hollow body element (21, 21').

10. The method in accordance with claim 1, wherein a spring-loaded cam (27) having a cam surface (24) inclined to the path of movement (20) of the section is pressed by the front end of the section at the outlet end of the last working station (D) against the force of a spring device (26) and, after separation of the hollow body element (21) formed at the front end of the section, tilts this hollow body element downwardly in order to facilitate its removal from the progressive tool (10).

11. The method in accordance with claim 1, wherein the section (1) is strictly constrained sideways by stationary guides which can however expand sideways by a small amount in a direction transverse to said direction of movement (20) of said section.

12. The method in accordance with claim 1, wherein the section (1) is allowed to expand freely upwardly.

13. The method in accordance with claim 4, wherein punch (64, 66) for carrying out the upsetting operation and a hole punch (84, 86) for carrying out the piercing operation operate from opposite sides of the section (1) on this section.

14. The method in accordance with claim 1, wherein a punch (64, 66) for carrying out the upsetting operation and a hole punch (84, 86) for carrying out the piercing operation operate from the same side of the section (1) on this section.

15. The method in accordance with claim 4, wherein on carrying out an indentation operation, the indentation is carried out by means of respective indentation punches (68, 70, 88, 90) from two sides of the section.

16. The method in accordance with claim 1, wherein on carrying out the upsetting operation using an upsetting punch, the section (1) is supported at a side of the section remote from the upsetting punch (64, 66) by a die (92, 94) having a cylindrical recess which has an internal diameter which is larger than a raised portion (202) formed in the section (1) by the upsetting operation, with an axial depth of the recess being so dimensioned that said raised portion (202) generated by said upsetting operation is flat at its end face (204) but adopts a ball-like shape at its outer side.

17. The method in accordance with claim 16 wherein, during the piercing operation a hole punch (84, 86) is used which has at least substantially the same diameter as the upsetting punch (64, 66).

18. The method in accordance with claim 17, wherein an indentation operation is carried out with an indentation punch (88, 90) which acts at an end face of the raised portion (202) produced by said upsetting operation being guided within a cylinder (214) which restricts radial expansion of the raised portion (202) and leads to an at least approximately sharp outer edge (216) of the raised portion (202) at an inner face (204) thereof which merges into an undercut (218).

19. The method in accordance with claim 4, wherein a section (1) is used which is at least substantially rectangular in cross-section and which has two bars (7, 8) at a side which later confronts the component, the two bars having a spacing from one another, extending parallel to longitudinal sides of the section and being likewise at least substantially rectangular in cross-section, with the bars being separated from one another by a groove (5) which is broader in comparison to the bars, which is rectangular in cross-section and having a depth which corresponds at least substantially to the height of the bars (7, 8).

20. The method in accordance with claim 19, wherein a section is used in which the bars each have an inclined flank at an inner side which forms an under-cut.

21. The method in accordance with claim 19, wherein an upsetting punch (64, 66) is used in said upsetting operation with a diameter which corresponds at least substantially to a core diameter of a thread (29) which is later to be formed in the finished hollow body element (21, 21') and wherein, during the carrying out of the upsetting operation, the section is supported on a die (92, 94) having a tubular projection (230) with a rounded inner edge (232) at an end face thereof and there being within the tubular projection (230) a pin (234) with a central raised portion (236) which is dimensioned to form a conical recess (238) in a free end face of the raised portion generated by the upsetting operation, said conical recess serving as a conical entry guide for a bolt element introduced into the thread (29) formed in said hollow body element (21, 21').

22. The method in accordance with claim 21, wherein said piercing operation is carried out with a piercing punch (84, 86) which has at least substantially the same diameter as said upsetting punch.

23. The method in accordance with claim 22, wherein a stepped punch is used as the upsetting punch and has a front cylindrical part (250) having a first diameter which merges via a conical ring shoulder (252) into a rear portion (254) having a second diameter larger than said first diameter, with the conical ring shoulder (254) already forming a ring chamfer (254) in said hollow body element (21, 21').

24. The method in accordance with claim 1, wherein a section (1) is used which has longitudinal sides, is at least substantially rectangular in cross-section and which has two bars (7, 8) at a side which later confronts said component, the two bars having a spacing from one another, extending parallel to said longitudinal sides of said section and being likewise at least substantially rectangular in cross-section, said two bars (7, 8) being bounded or formed by respective grooves (5', 5") which likewise extend parallel to the longitudinal sides of the section (1), have an at least substantially rectangular cross-section and also a depth which corresponds to a height of the respective bars (7, 8) with a first side of each groove (5', 5") which forms an inner flank of a respective bar and also a second side of each groove being inclined so that a dovetail-like groove cross-section is present.

25. The method in accordance with claim 24 wherein, in a first upsetting operation, a conical recess (270) is produced in a region of the section (1) between said two grooves (5', 5"), with a conical raised portion (272) simultaneously arising at the side of the section opposite to the recess; and wherein a cylindrical projection (274) with a central recess (276) is produced within the conical recess and merges via a conical ring-shoulder (278) into a base surface (280), with the conical raised portion (272) having a cylindrical recess (282) at a middle portion, said cylindrical recess having a conical ring surface (284) which merges into a base surface (286).

26. The method in accordance with claim 25 wherein, after the upsetting operation, a piercing operation is carried out and the elements (21, 21') are subsequently separated from the section and a thread (29) is produced in the pierced region.

27. The method in accordance with claim 1, wherein a section (1) is used which is at least substantially rectangular in cross-section and which has two bars (7, 8) at a side which later confronts said component, the two bars having a spacing from one another, extending parallel to longitudinal sides of the section and being likewise at least substantially rectangular in cross-section, wherein the two bars (7, 8) are bounded or formed by respective grooves (5', 5") which likewise extend parallel to the longitudinal sides of the section (1), have an at least substantially rectangular cross-section and also a depth which corresponds to the height of the respective bars, the grooves also forming a central region of the section, and wherein sides of the grooves which form inner flanks of the bars and outer flanks of a central region of the section stand perpendicular to at least one of a lower side and an upper side of said section.

28. The method in accordance with claim 1, wherein transversely extending notches are formed in said section prior to the cut-off operation at said cut-off positions with the notches forming weak points at the cut-off positions.

29. The method in accordance with claim 1, wherein, in one working station (A) of the progressive tool, a cut-out operation is carried out in order to punch holes (6) in the section (1) at said cut-off positions said holes being one of elongate slots and a plurality of holes of circular cross-section which are arranged transverse to said longitudinal direction of the section (1), i.e. in a row transverse to the longitudinal direction of the section, in order to facilitate the later cut-off operation.

30. The method in accordance with claim 29, wherein said cut-out operation is carried out as a first working step in the progressive tool.

31. The method in accordance with claim 29, wherein the elongate holes (6) or the rows of cylindrical holes do not extend into regions of the section (1) in which the bars (7, 8) are provided.

32. The method in accordance with claim 29, wherein the cut-out operation is effected with a cut-out punch (126, 128) having a cross-section (300+302) with the form of one of an hour glass and a bollard.

* * * * *